US007590328B2

(12) United States Patent
Reinhardt et al.

(10) Patent No.: US 7,590,328 B2

(45) Date of Patent: Sep. 15, 2009

(54) FIBER TERMINATION BLOCK WITH SPLITTERS

(75) Inventors: Jacob E. Reinhardt, Minneapolis, MN (US); Pon Nhep, Savage, MN (US); Trevor D. Smith, Eden Prairie, MN (US); Ray Hagen, Apple Valley, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/888,913

(22) Filed: Aug. 2, 2007

(65) Prior Publication Data

US 2009/0034929 A1 Feb. 5, 2009

(51) Int. Cl.
*G02B 6/36* (2006.01)
*G02B 6/00* (2006.01)

(52) U.S. Cl. ...................................... 385/135; 385/134

(58) Field of Classification Search ................ 385/134, 385/135

See application file for complete search history.

(56) References Cited

U.S. PATENT DOCUMENTS

| | | | | |
|---|---|---|---|---|
| 5,497,444 | A | 3/1996 | Wheeler | |
| 5,717,810 | A | 2/1998 | Wheeler | |
| 5,758,003 | A | 5/1998 | Wheeler et al. | |
| 6,591,051 | B2 | 7/2003 | Solheid et al. | |
| 6,885,798 | B2 | 4/2005 | Zimmel | |
| 7,218,827 | B2 | 5/2007 | Vongseng et al. | |
| 7,310,474 | B2 * | 12/2007 | Kanasaki et al. | 385/147 |
| 7,352,945 | B2 * | 4/2008 | Holmberg et al. | 385/135 |
| 7,474,828 | B2 * | 1/2009 | Leon et al. | 385/135 |
| 2006/0093301 | A1 | 5/2006 | Zimmel et al. | |
| 2006/0188210 | A1 | 8/2006 | Zimmel | |
| 2006/0228086 | A1 | 10/2006 | Holmberg et al. | |
| 2006/0269205 | A1 | 11/2006 | Zimmel | |
| 2006/0269206 | A1 | 11/2006 | Zimmel | |
| 2007/0025675 | A1 | 2/2007 | Kramer | |
| 2007/0077019 | A1 * | 4/2007 | Barth et al. | 385/135 |
| 2007/0147765 | A1 | 6/2007 | Gniadek et al. | |
| 2007/0189692 | A1 | 8/2007 | Zimmel et al. | |
| 2008/0219633 | A1 | 9/2008 | Smith et al. | |

OTHER PUBLICATIONS

International Search Report and Written Opinion mailed Dec. 4, 2008.

* cited by examiner

*Primary Examiner*—Tina M Wong
(74) *Attorney, Agent, or Firm*—Merchant & Gould P.C.

(57) ABSTRACT

The present invention relates to the management of cables extending to and from fiber termination blocks with sliding fiber adapter modules within a fiber distribution frame. The blocks include a splitter chassis and fiber optic splitters mounted within the chassis.

18 Claims, 32 Drawing Sheets

28
38
22
24
34
36
39
39

22
48
60
84
90
92
58
38

20
36
34
44
102
104
110
130
132

96
96
96
96
92
58
64
90
66
52

FIBER TERMINATION BLOCK WITH SPLITTERS

FIELD OF THE INVENTION

The present invention relates to cable management for optical fiber termination systems. Specifically, the invention relates to signal splitting, terminations, and cable guides for managing the fiber optic cables within a frame.

BACKGROUND OF THE INVENTION

In the telecommunications industry, the demand for added capacity is growing rapidly. This demand is being met in part by the increasing use and density of fiber optic transmission equipment. Even though fiber optic equipment permits higher levels of transmission in the same or smaller footprint than traditional copper transmission equipment, the demand requires even higher levels of fiber density. This has led to the development of high-density fiber handling equipment.

Examples of this type of equipment are found in U.S. Pat. Nos. 5,497,444; 5,717,810; 5,758,003; and 6,591,051. These patents disclose systems of high-density fiber distribution frames and high-density termination blocks (FTBs) which are mounted to the frames.

Typically, the splitting of an input signal into multiple output signals has been handled by separate equipment. There is a need to manage more efficiently splitting and termination functions associated with optical fiber systems. Further development in fiber termination systems is desired.

SUMMARY OF THE INVENTION

An aspect of this invention relates to a fixture for managing cables attached to adapter modules. The adapter modules slide relative to the fixture for access to selected adapters. The fixture includes a chassis for holding fiber optic splitter modules.

Another aspect of this invention relates to a fiber distribution frame with a plurality of fiber termination blocks with sliding cable adapter modules mounted to the frame. The modules are mounted to the blocks to allow selective access to an adapter. The modules may be configured in two groups which slide from opposite sides of the blocks. A splitter chassis is mounted to each fiber termination block for holding one or more fiber optic splitters.

A variety of advantages of the invention will be set forth in part in the detailed description that follows, and in part will be apparent from the description, or may be learned by practicing the invention. It is understood that both the foregoing general description and the following detailed description are explanatory only and are not restrictive of the invention as claimed.

BRIEF DESCRIPTION OF THE DRAWINGS

Accompanying drawings, which are incorporated in and constitute a part of the specification, illustrate several aspects of the invention, and together with the description, serve to explain the principles of the invention. A brief description of the drawings is as follows.

DETAILED DESCRIPTION

Reference will now be made in detail to exemplary aspects of the present invention that are illustrated in the accompanying drawings. Wherever possible, the same reference numbers will be used throughout the drawings to refer to the same or like parts.

Figure 1:
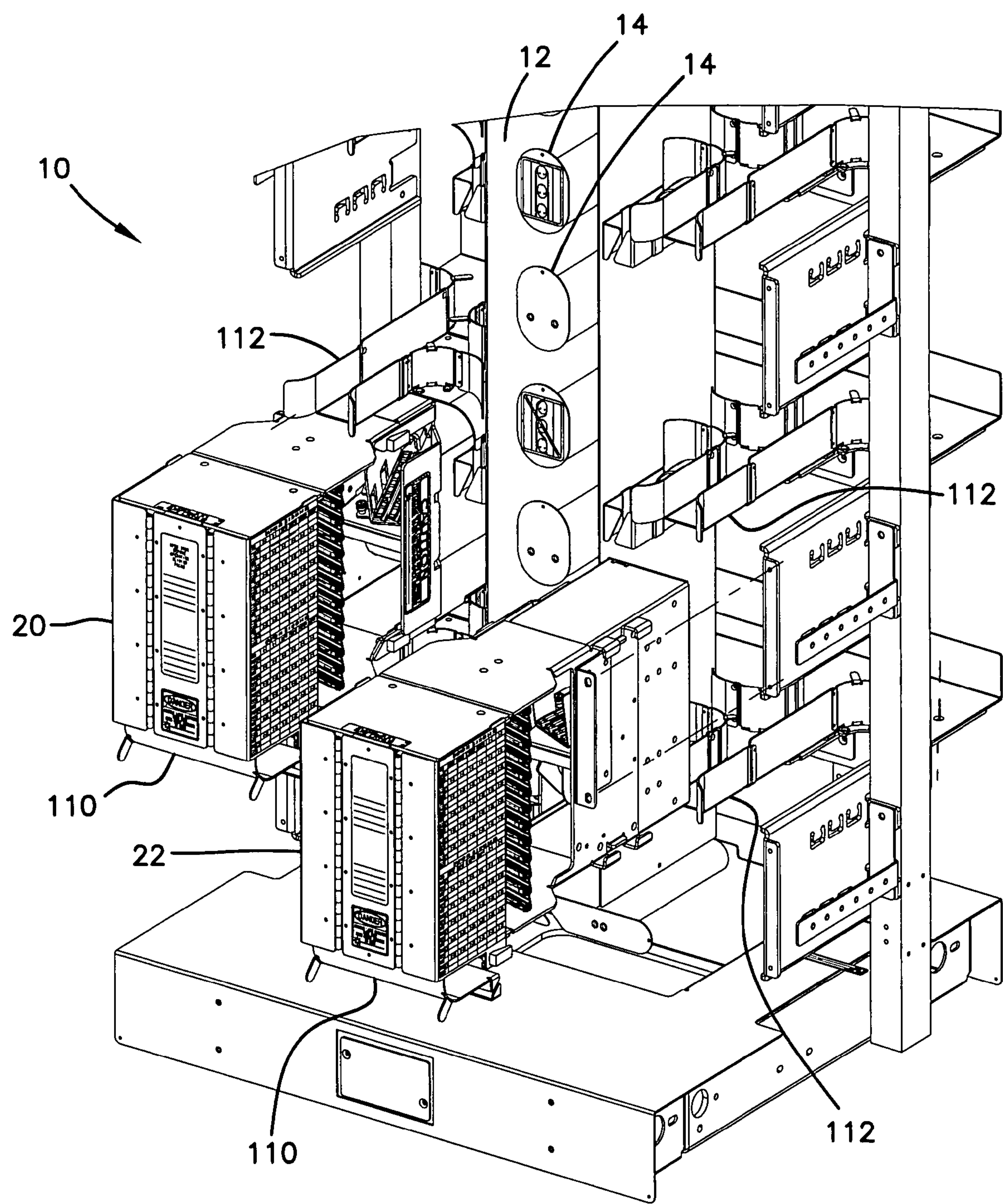
FIG. 1 is a front perspective view of a high-density fiber distribution frame with fiber termination blocks in accordance with the concepts of the present invention, wherein only a lower portion of the frame is shown with one fiber termination block positioned on each side of the frame, and the right fiber termination block is shown exploded from the frame.
Figure 2:
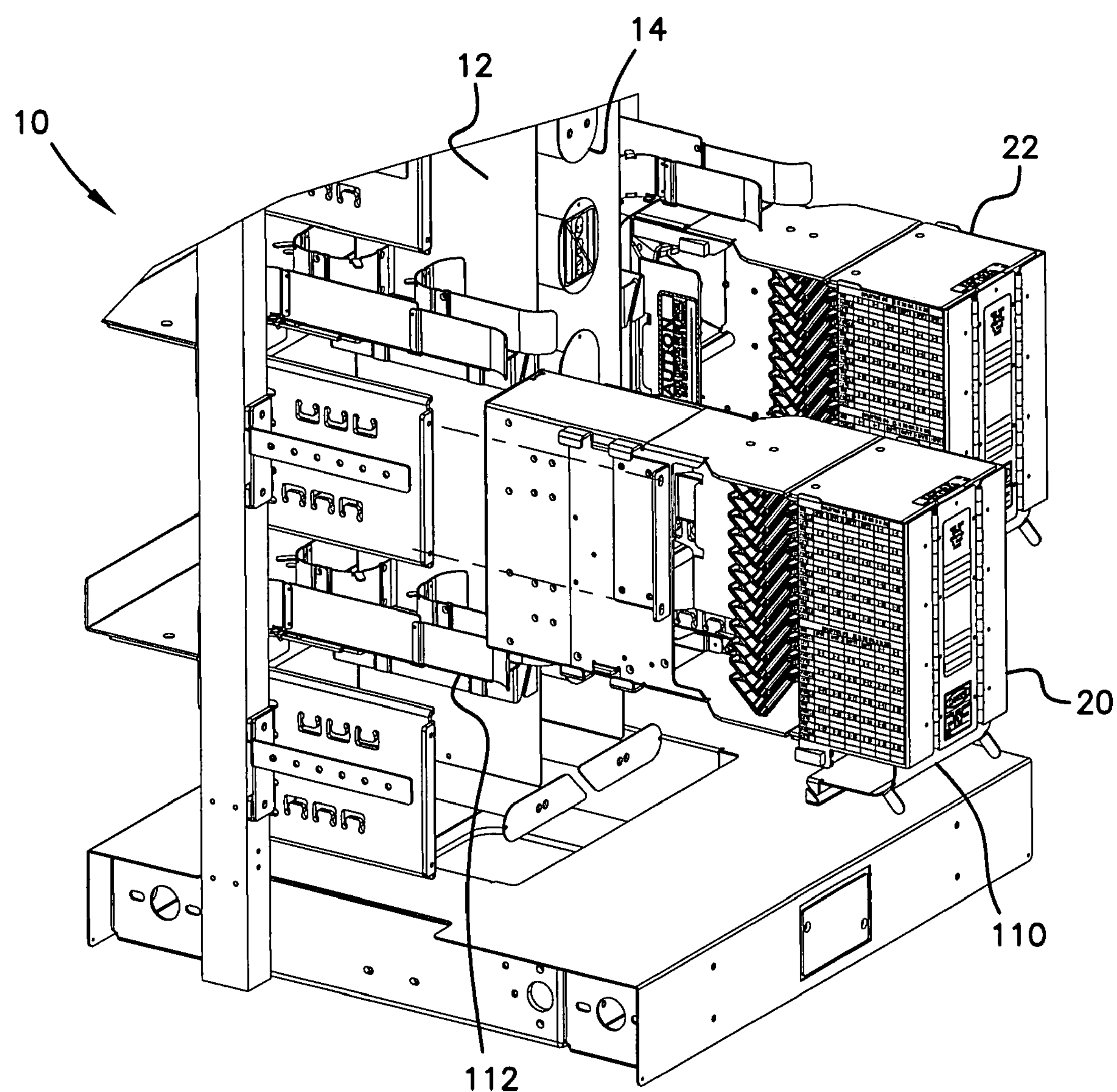
FIG. 2 is another front perspective view showing the frame of FIG. 1, with the left fiber termination block shown exploded from the frame.

Referring now to FIGS. 1 and 2, a fiber distribution frame 10 is shown. Similar fiber distribution frames are the subject of U.S. Pat. Nos. 5,758,003 and 6,591,051, the disclosures of which are herein incorporated by reference. Attached to fiber distribution frame 10 are a plurality of fiber termination blocks or fixtures, mounted in two vertical rows of blocks 20 on the left side of frame 10 and blocks 22 on the right side of frame 10. Only one block 20, 22 is shown mounted to frame 10 in each row. Additional blocks 20, 22 can be mounted above the blocks shown to fully load frame 10.

Located between the two rows of fiber termination blocks 20, 22 is a cable storage trough 12 including a series of spools 14 for organizing and storing excess slack for any cables to link between optical fiber terminations inside fiber termination blocks 20, 22 and/or other equipment.

Note that fiber termination blocks 20, 22 are essentially the same device, but mirror images of one another for mounting on the left and right side of the fiber distribution frame 10, respectively. Items called out and identified for either block 20, 22 should be understood to apply to the other block, unless otherwise specifically mentioned.

Figure 3:
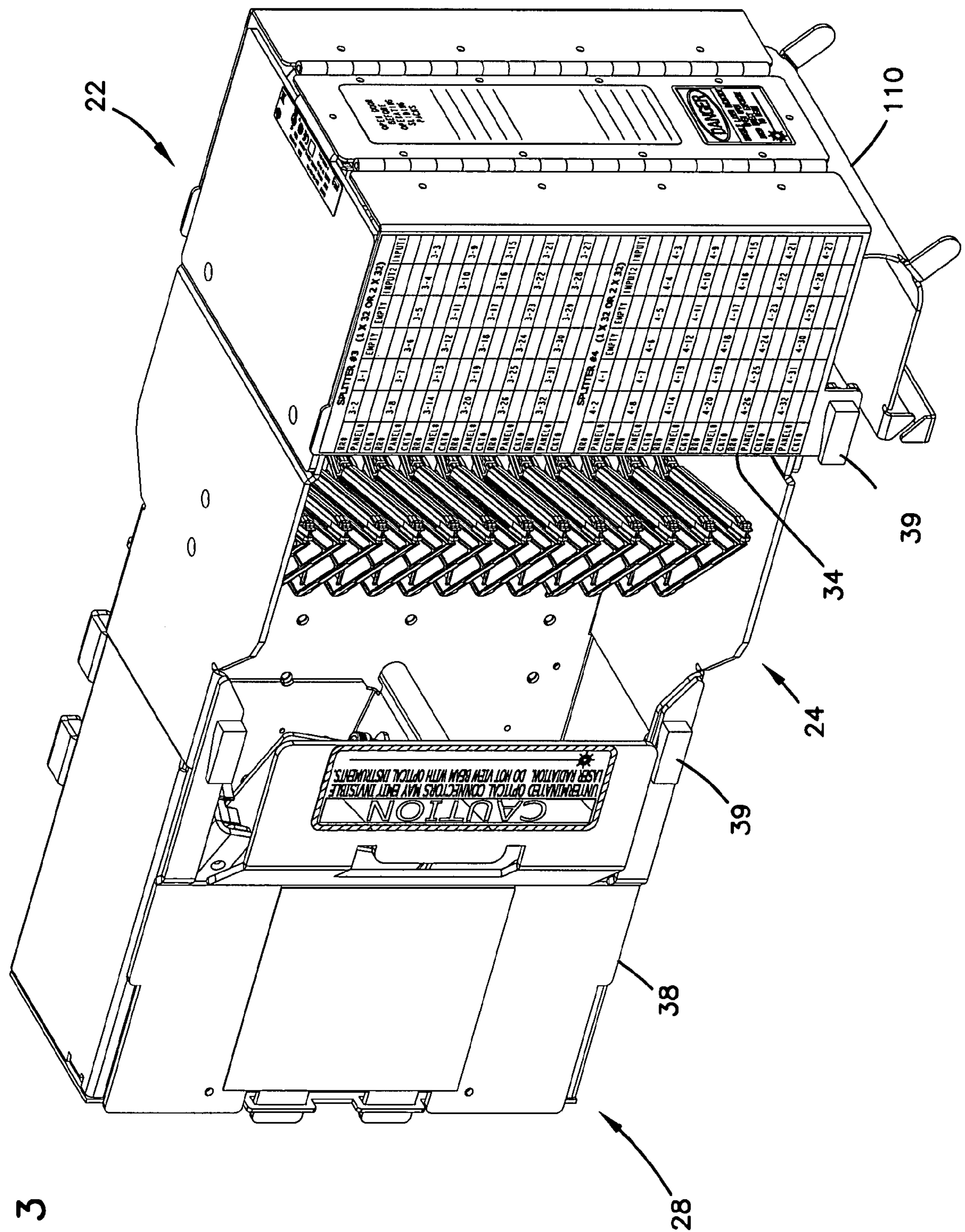
FIG. 3 is a perspective view of one of the fiber termination blocks from the right side of the frame of FIGS. 1 and 2.
Figure 4:
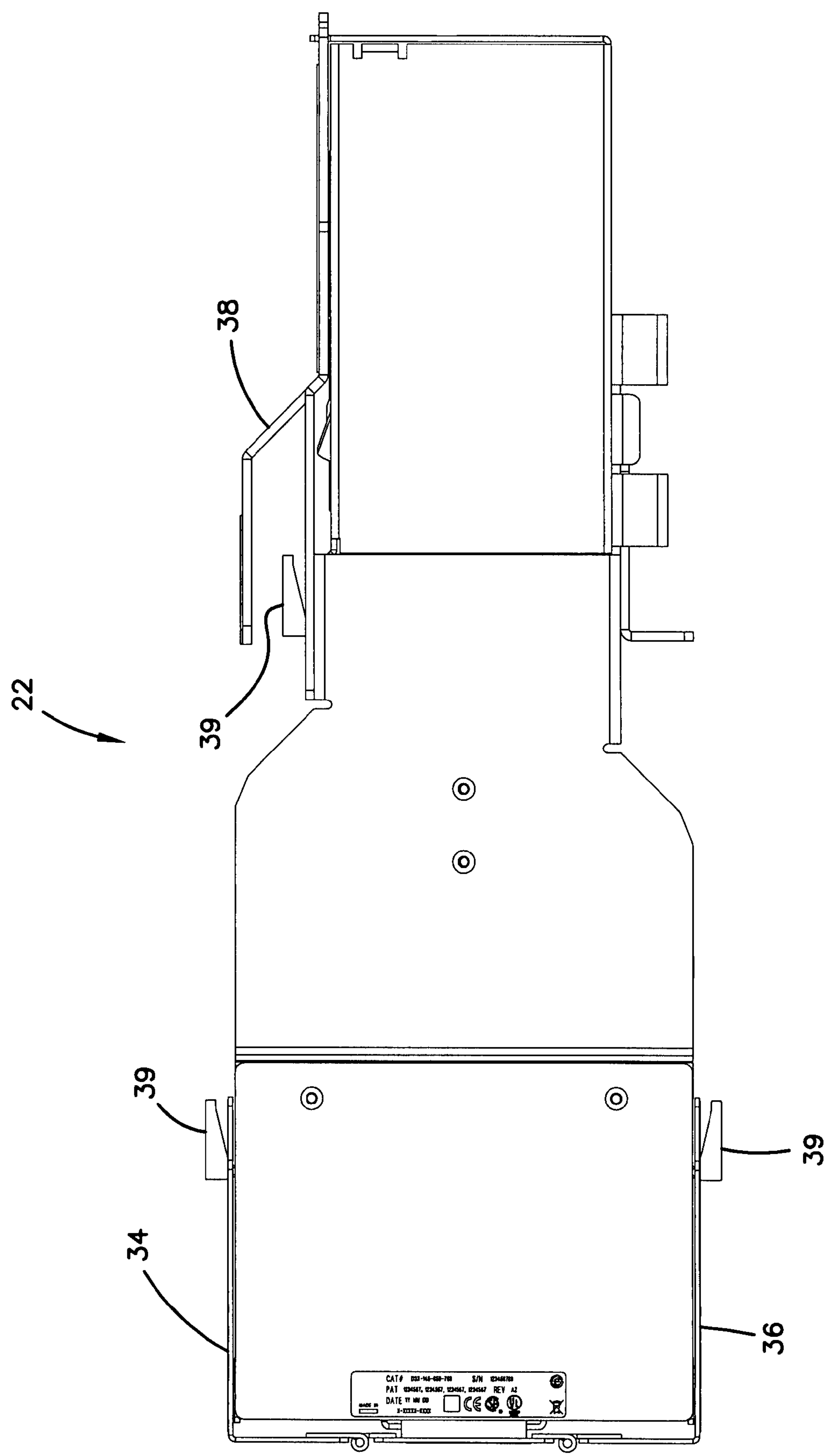
FIG. 4 is a top view of the right fiber termination block of FIG. 3.
Figure 5:
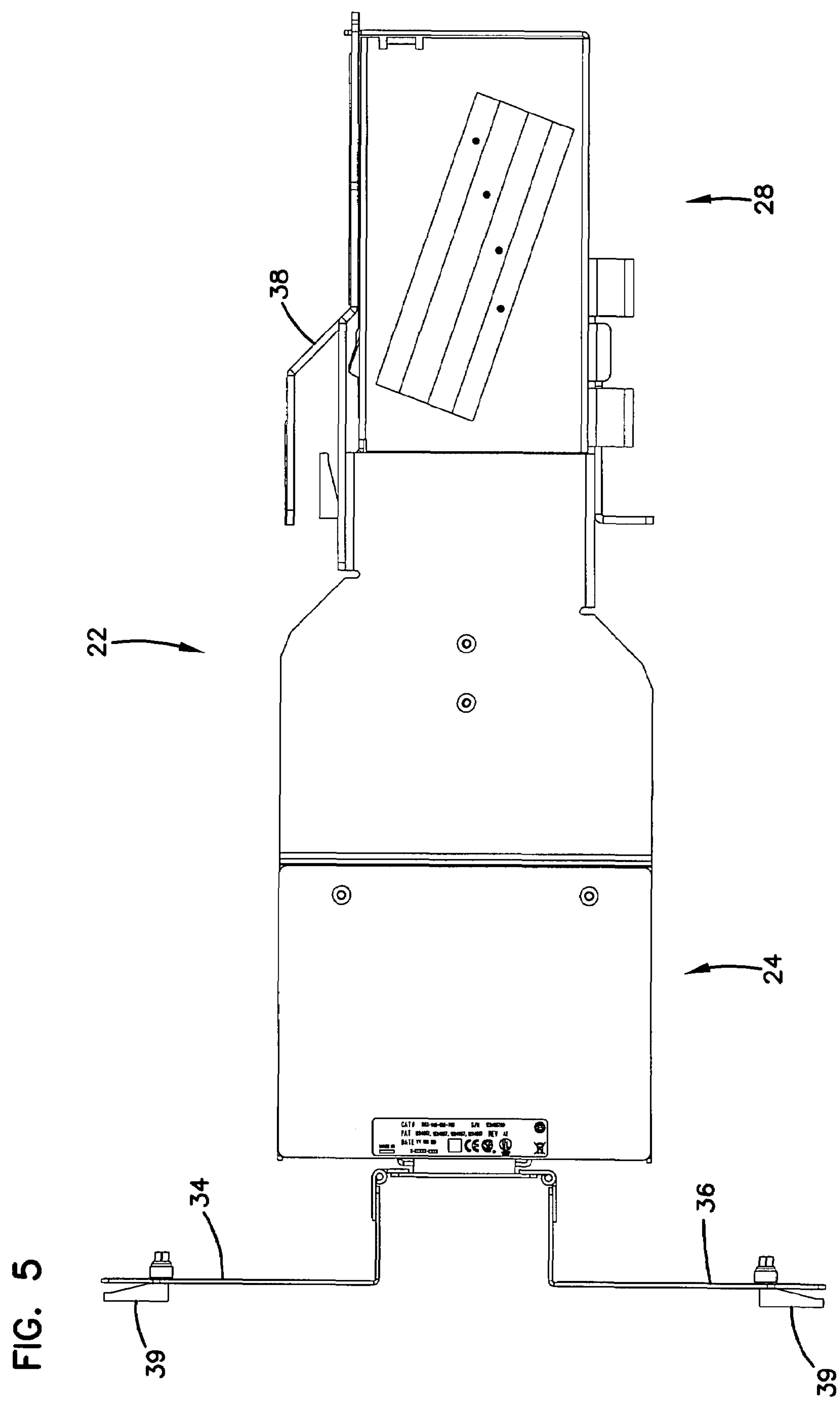
FIG. 5 is a further top view of the right fiber termination block of FIG. 3, showing the termination access panels in the open positions.
Figure 6:
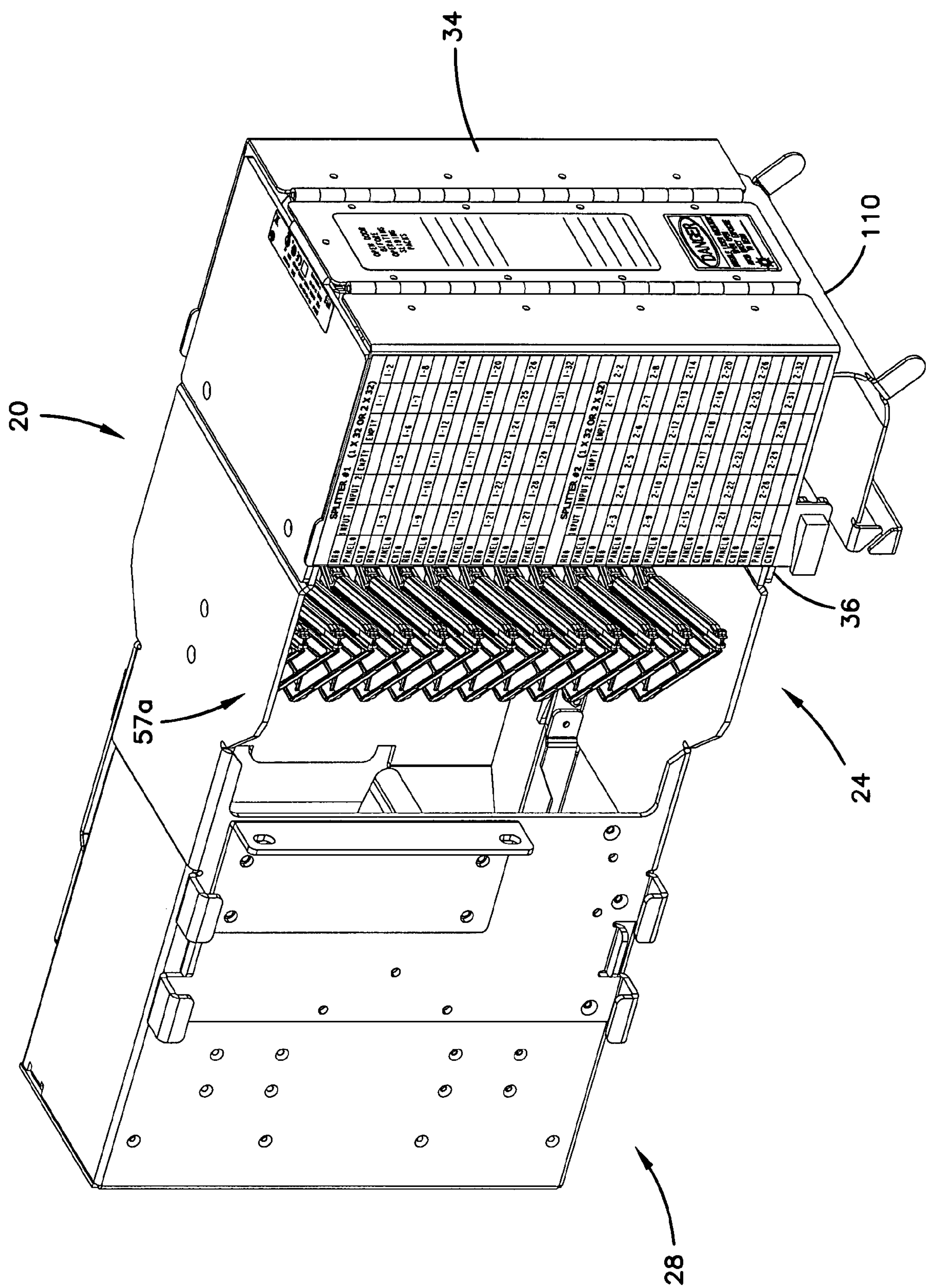
FIG. 6 is a perspective view of one of the fiber termination blocks from the left side of the frame of FIGS. 1 and 2.
Figure 7:
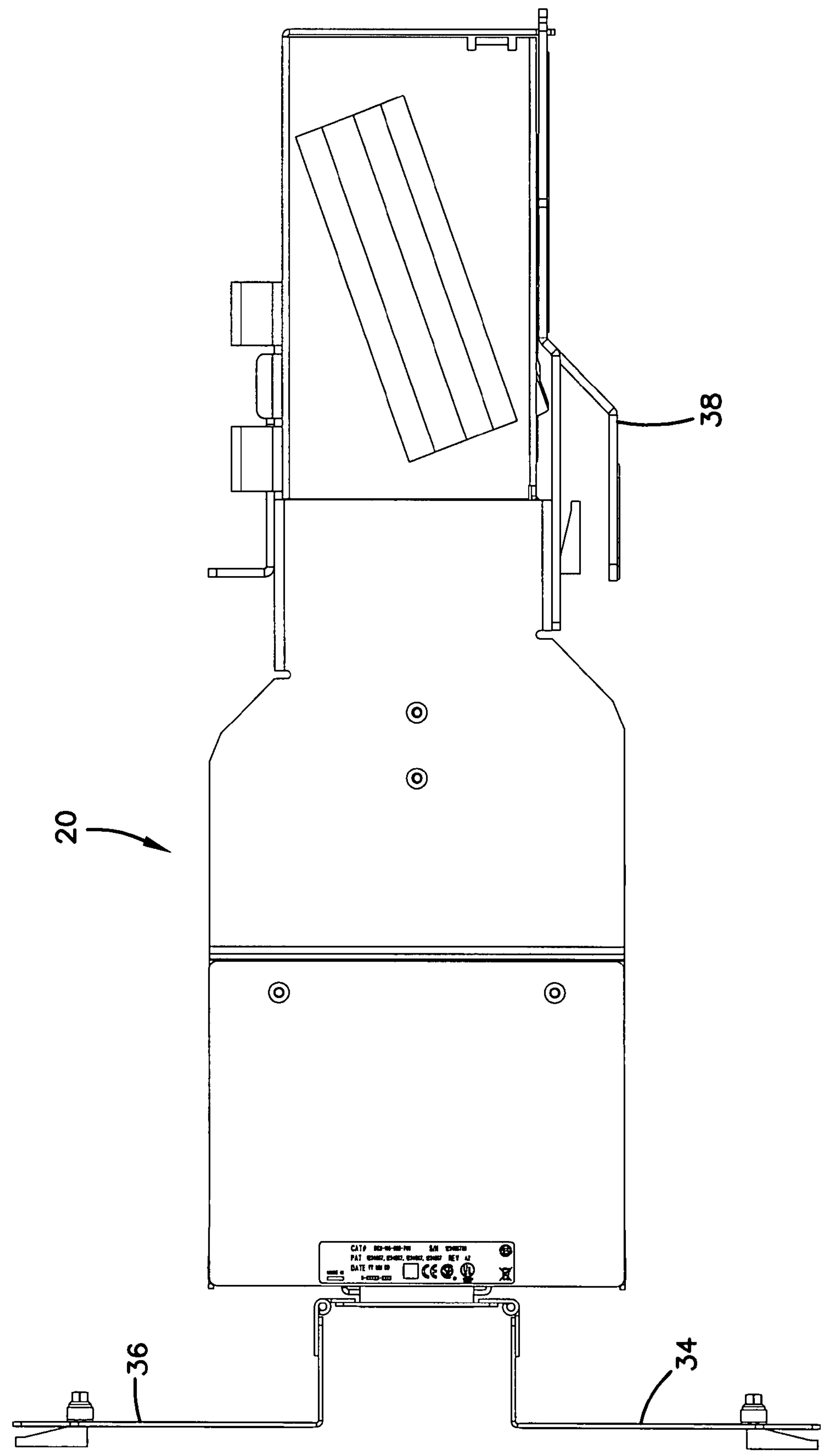
FIG. 7 is a top view of the left fiber termination block of FIG. 6, showing the termination access panels in the open positions.
Figure 8:
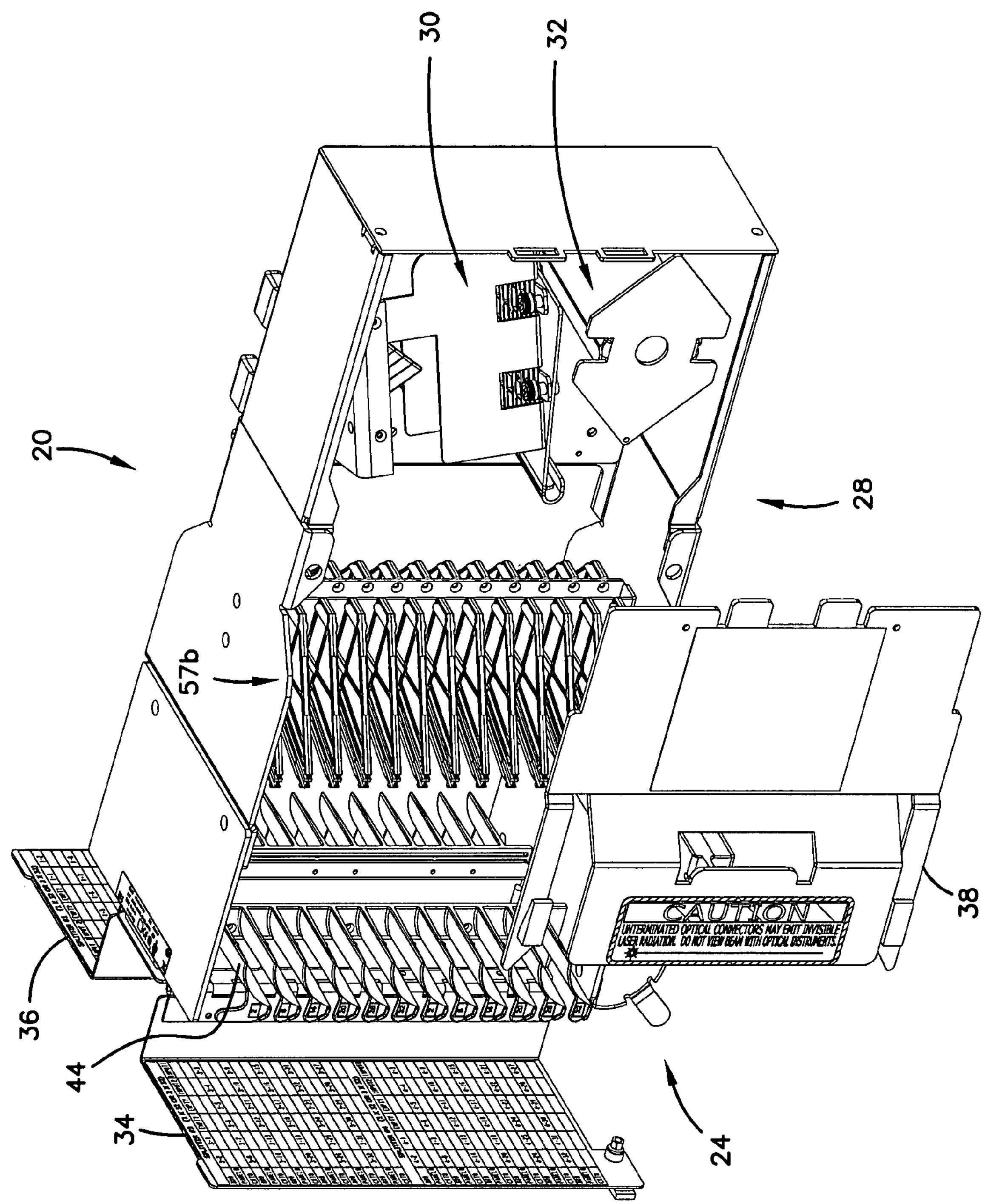
FIG. 8 is a perspective view of the left fiber termination block, showing the termination access panels in the open positions, and an access cover removed.
Figure 9:
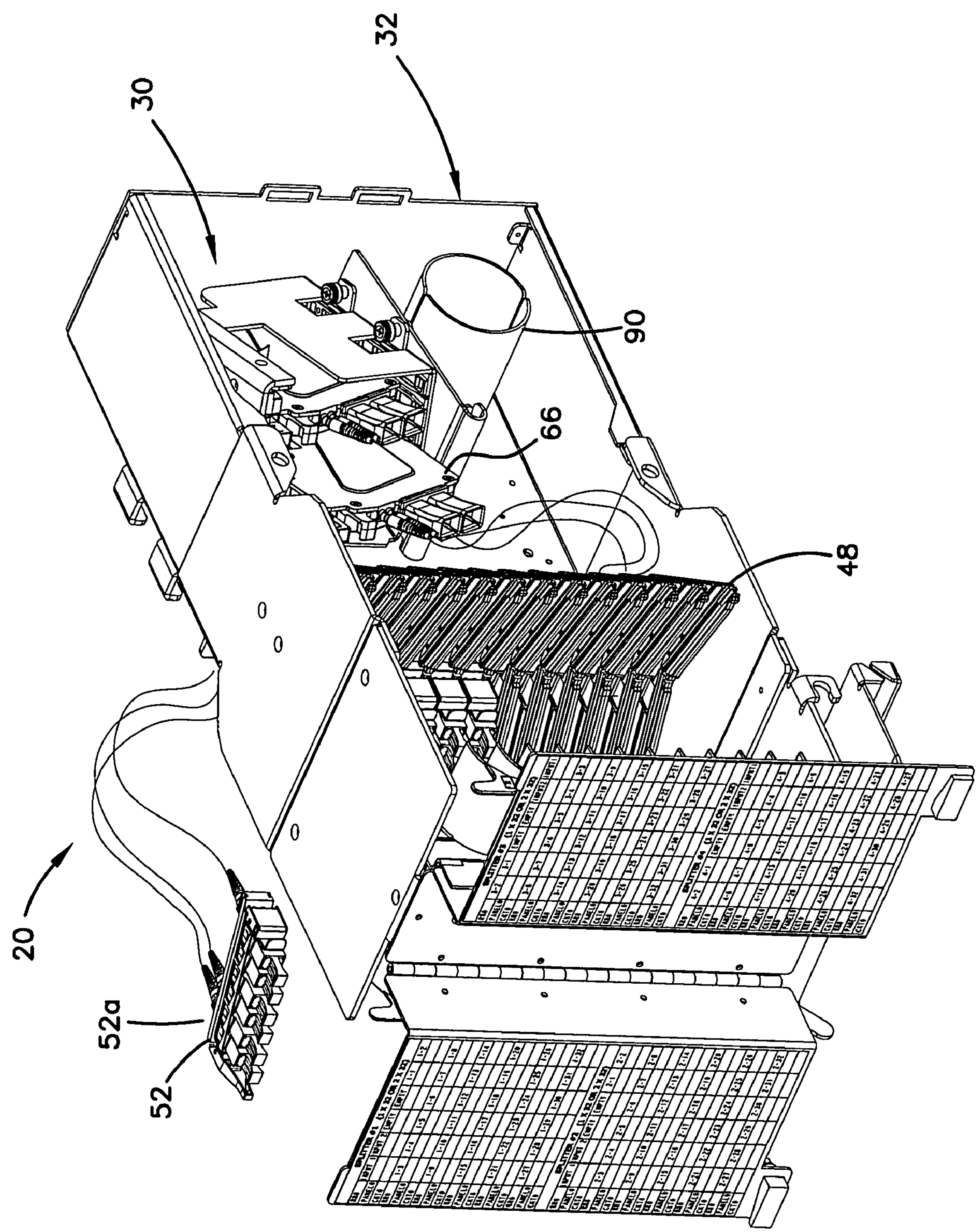
FIG. 9 is a perspective view of the left fiber termination block of FIG. 6, showing installation of one splitter and one of the adapter modules.
Figure 10:
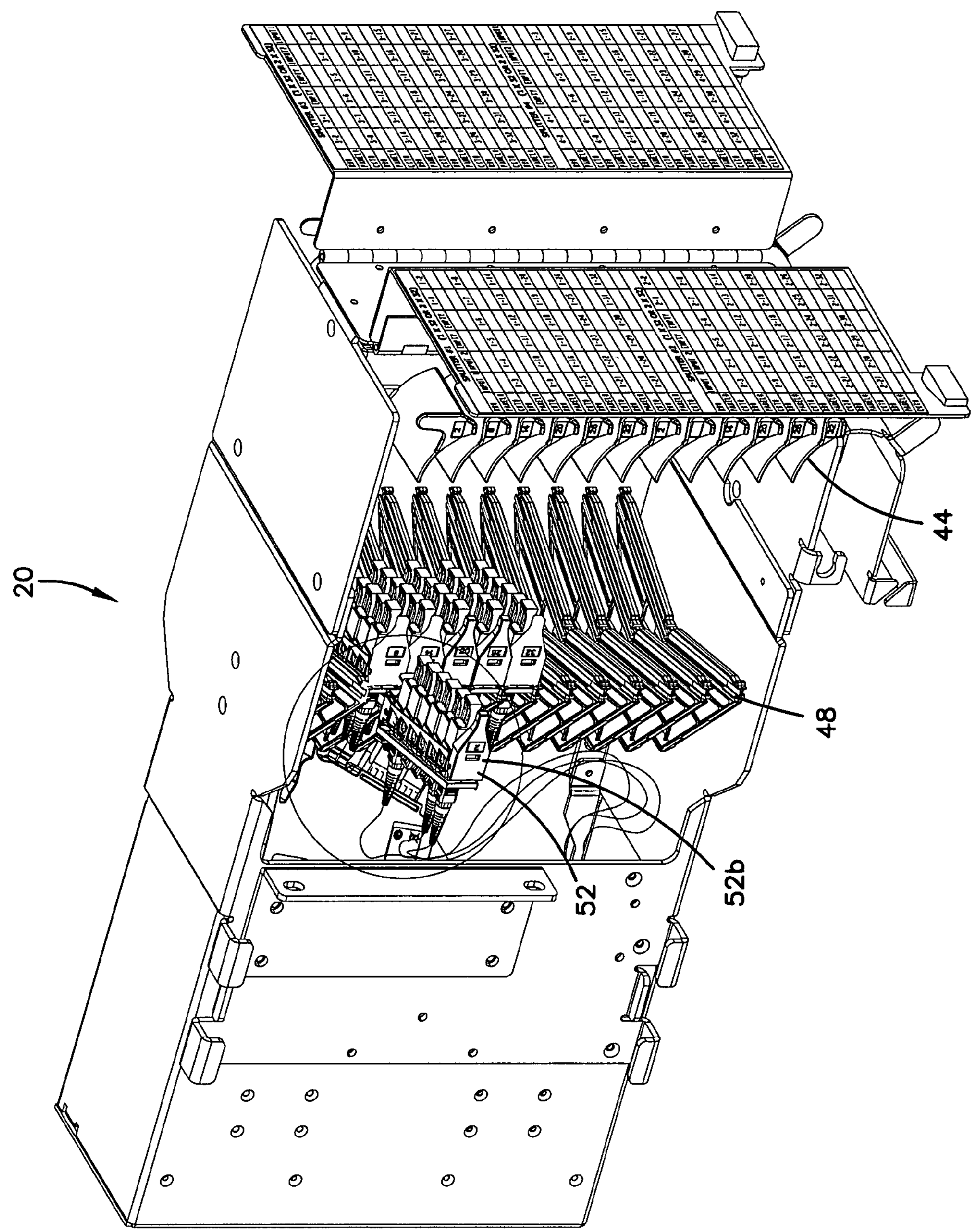
FIG. 10 is a further perspective view of the view of FIG. 9.
Figure 11:
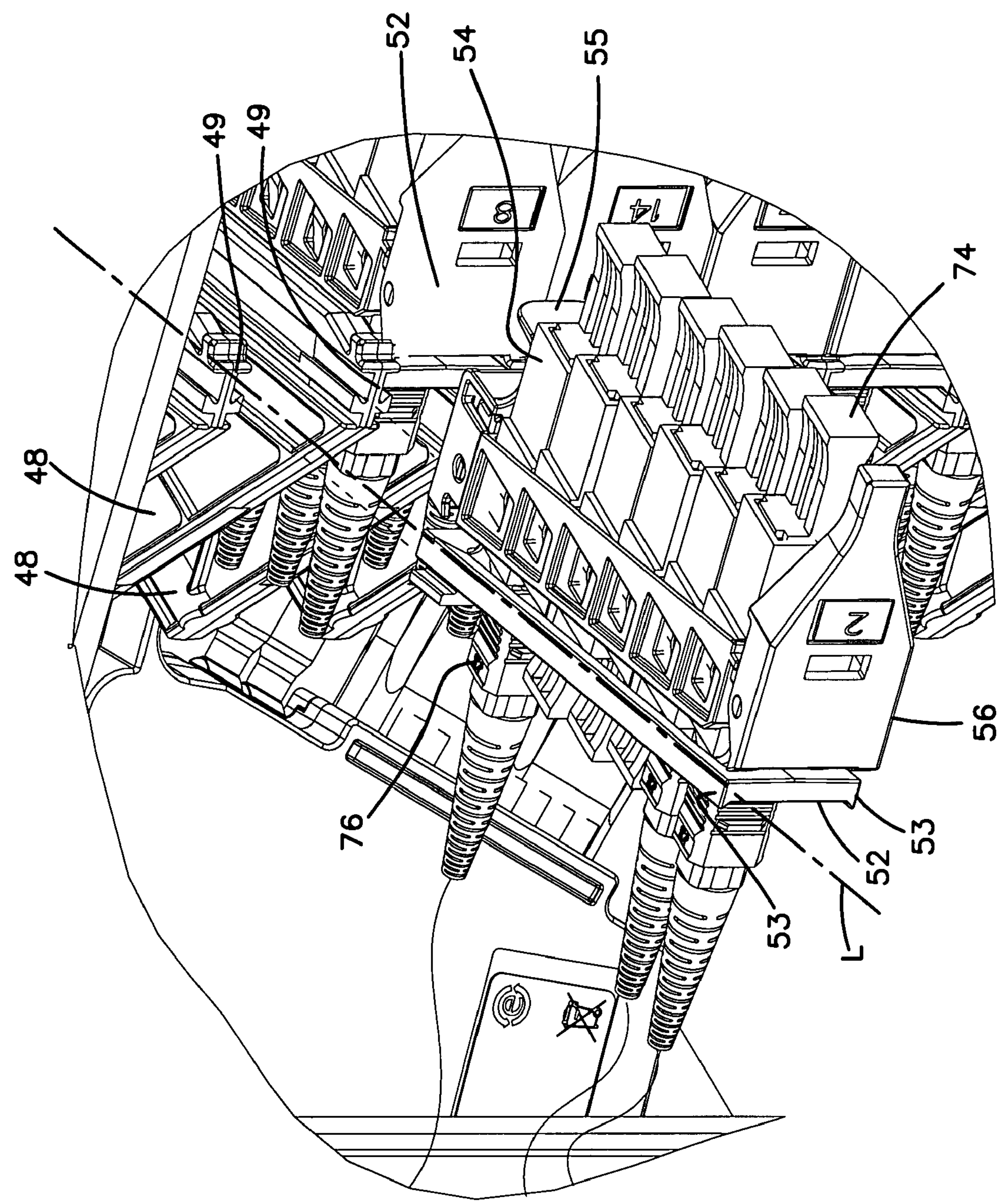
FIG. 11 is an enlarged view of a portion of the view of FIG. 10.
Figure 12:
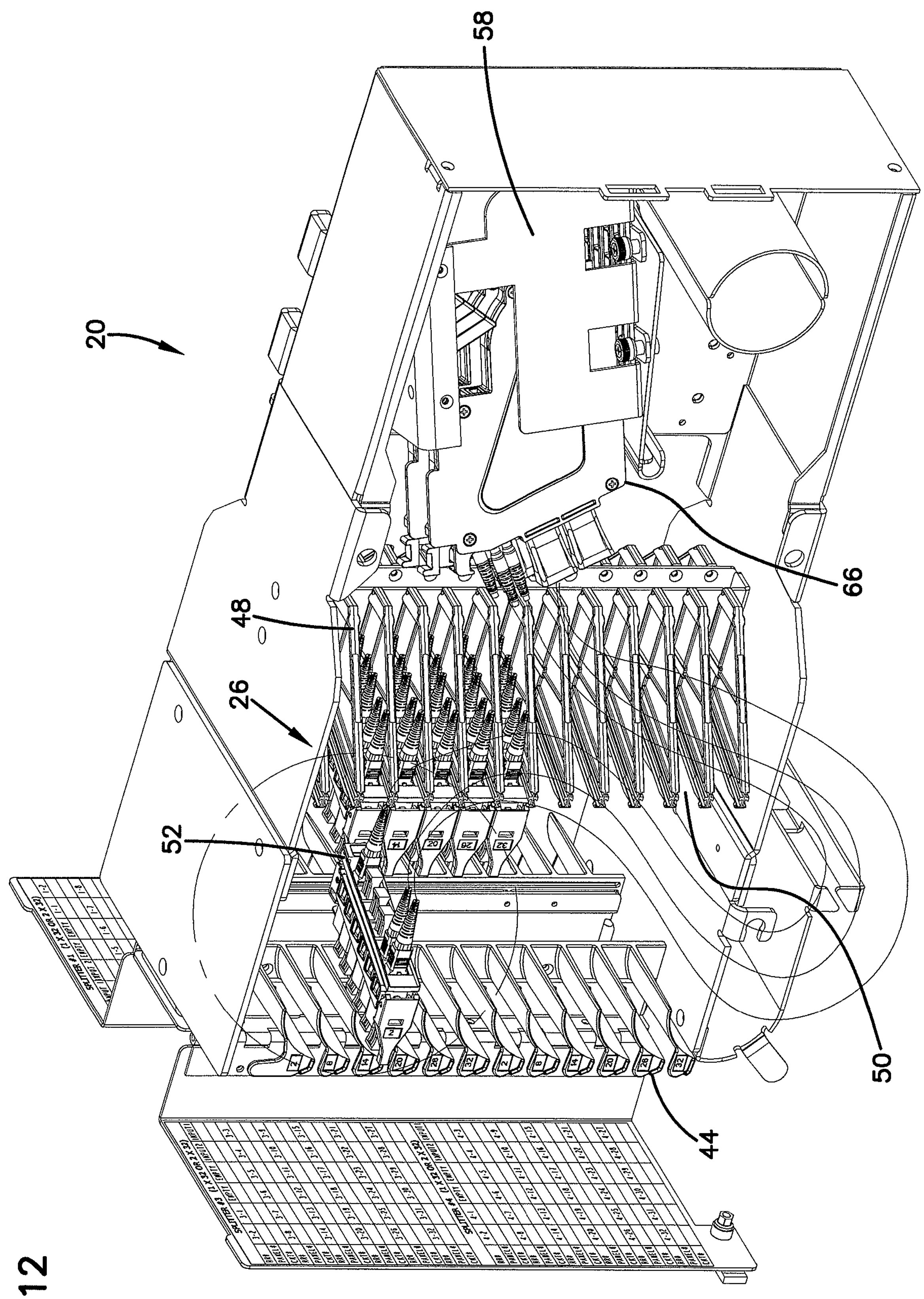
FIG. 12 is a further perspective view of the left fiber termination block of FIG. 9, showing installation of an additional splitter and an additional adapter module being mounted.
Figure 13:
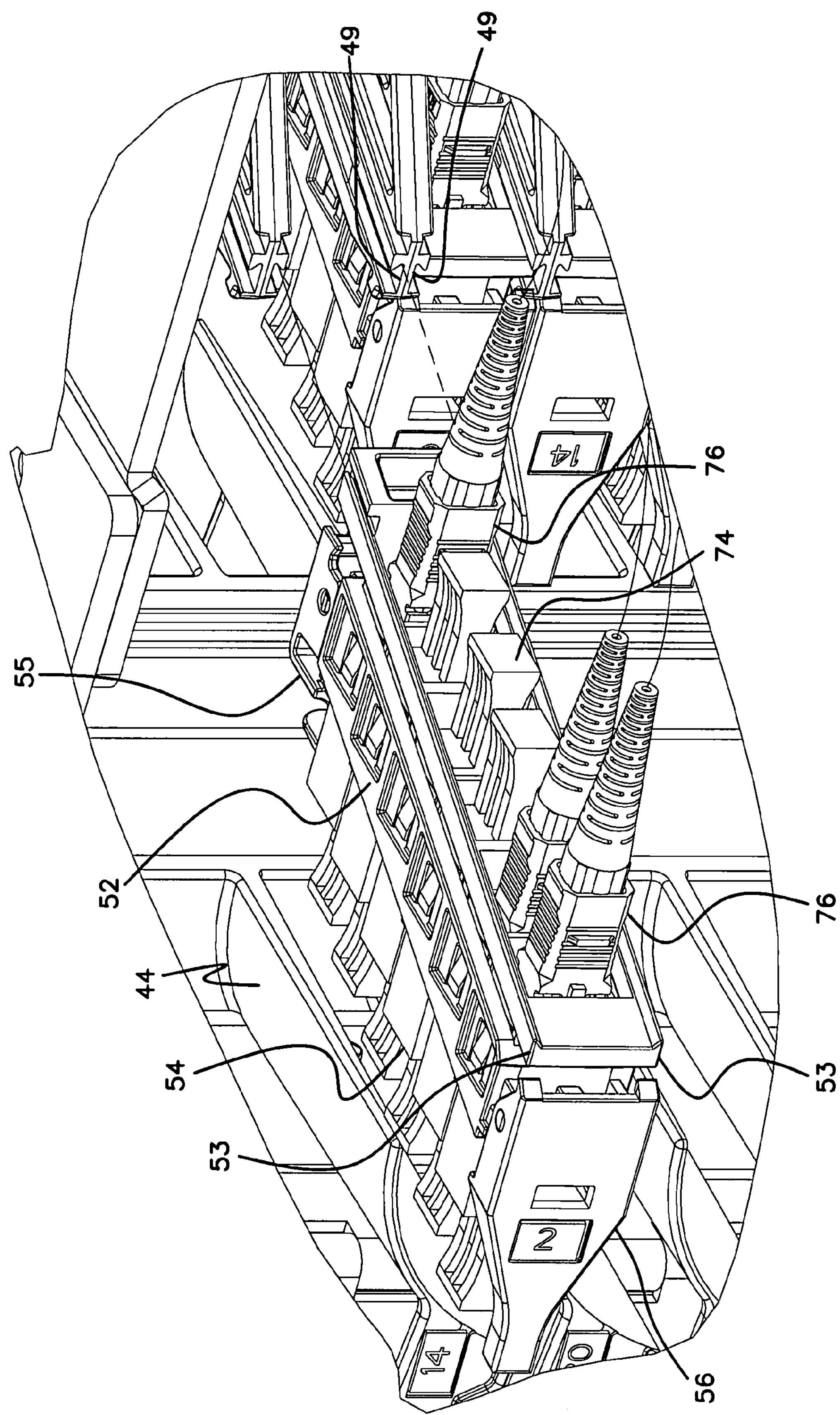
FIG. 13 is an enlarged view of a portion of the view of FIG. 12.

Referring now to FIGS. 3-5, right fiber termination block 22 mounts on a right-hand side of fiber distribution frame 10. As will be described in greater detail below, block 22 includes a front area 24 which defines a plurality of fiber optic terminations, such as adapters which connect axially aligned fiber optic connectors. A rear area 28 of block 22 defines a splitter area 30 and a slack storage area 32. Block 22 includes a plurality of covers to selectively protect internal components. Termination access panels 34, 36 protect front area 24 and the fiber optic terminations 26 contained therein. Rear access cover 38 protects splitter and slack storage areas 30, 32. Latches 39 allow for selective pivoting of panels 34, 36 or removal of cover 38.

As will be further described below, termination blocks 20, 22 allow for mounting of the blocks 20, 22 to the frame 10 with or without fiber optic splitters and cables extending therefrom mounted to the blocks.

Referring now to FIGS. 6-15, left fiber termination block 20 is shown as including front radius limiters 44 and divider walls 48. Divider walls 48 receive slideable adapter modules 52. Divider walls 48 and adapter modules 52 are preferably constructed as described in U.S. Pat. No. 6,591,051. Additional sliding adapter arrangements are described in U.S. Pat. Nos. 5,497,444 and 5,717,810, and U.S. Publication No. 2007/0025675, the disclosures of which are herein incorporated by reference. Divider walls 48 define longitudinal guides 49 for receiving longitudinal guides 53 of the sliding adapter modules 52. Guides 49 are shown in the form of channels and guides 53 are shown in the form of rails. Adapter modules 52 slide linearly along line L (see FIG. 11). Each adapter module 52 includes a plurality of adapters 54 for receiving and connecting two fiber optic connectors 76. SC type connectors 76 and mating adapters 54 are shown. Other connector and adapter formats can be used. Dust caps 74 are shown in unused adapters 54.

Each adapter module 52 includes a spring loaded slide handle 55 to retain each module 52 with divider walls 48 at the end of the sliding outward movement, as described in U.S. Pat. No. 6,591,051. Each adapter module 52 further includes a pivoting handle 56 to allow selective access to the desired adapter module 52, as described in U.S. Pat. No. 6,591,051.

Divider walls 48 define a left side 57*a* and right side 57*b* for left and right adapter modules 52*a*, 52*b* to slide in opposite directions. Spaces or slots 50 between divider walls 48 each receive one of the adapter modules 52 during use.

With additional reference to FIGS. 16-32, left termination block 20 and right termination block 22 further include a splitter chassis 58 positioned in rear area 28 for holding one or more splitters 66. Each splitter 66 includes at least one input cable 70 and a plurality of output cables 72. Each of the input cables 70 and the output cables 72 are terminated with fiber optic connectors 76.

Splitters 66 include flanges 68, 69 which are received in mounting channels 62 in splitter chassis 58. In the illustrated embodiment, splitter chassis 58 defines four mounting slots 64 for receiving four splitters 66. When mounting the splitters 66 to the splitter chassis 58, each splitter is received within one of the mounting slots 64 within splitter chassis 58. Each adapter module 52 holding the connectorized inputs and outputs is received within adapter mounting slots 50 between walls 48 in termination area 26.

As shown in the figures, splitter chassis 58 is mounted at a slight angle relative to a rear of the chassis, and a slight angle relative to a side of the chassis. The open end 60 is both tipped to the open side and tipped down in the figures. Such a positioning improves cable management by not excessively bending the cables to and from each splitter 66.

Figure 14:
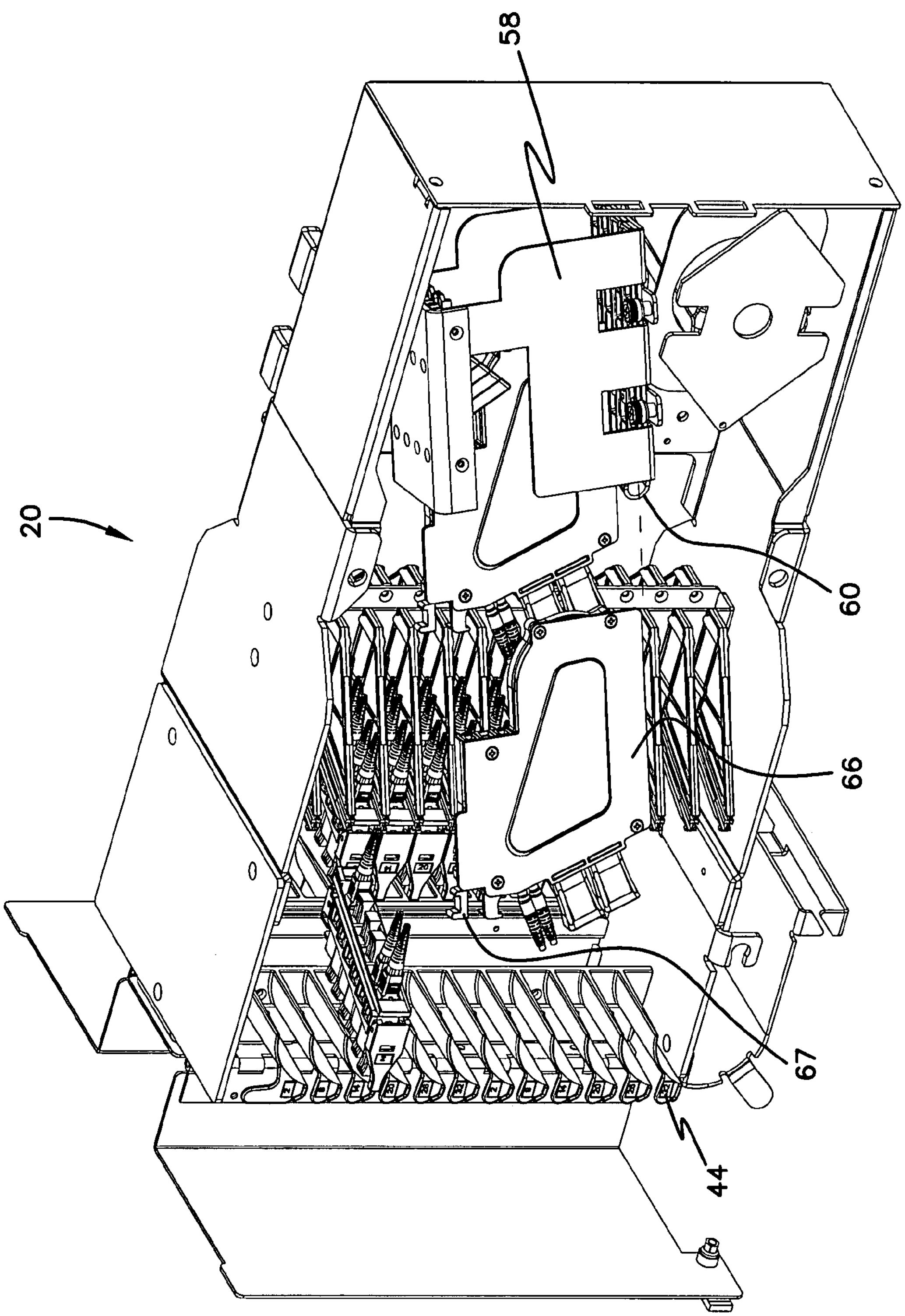
FIG. 14 is a further perspective view of the left fiber termination block of FIG. 6, showing the additional splitter exploded from the splitter chassis.
Figure 15:
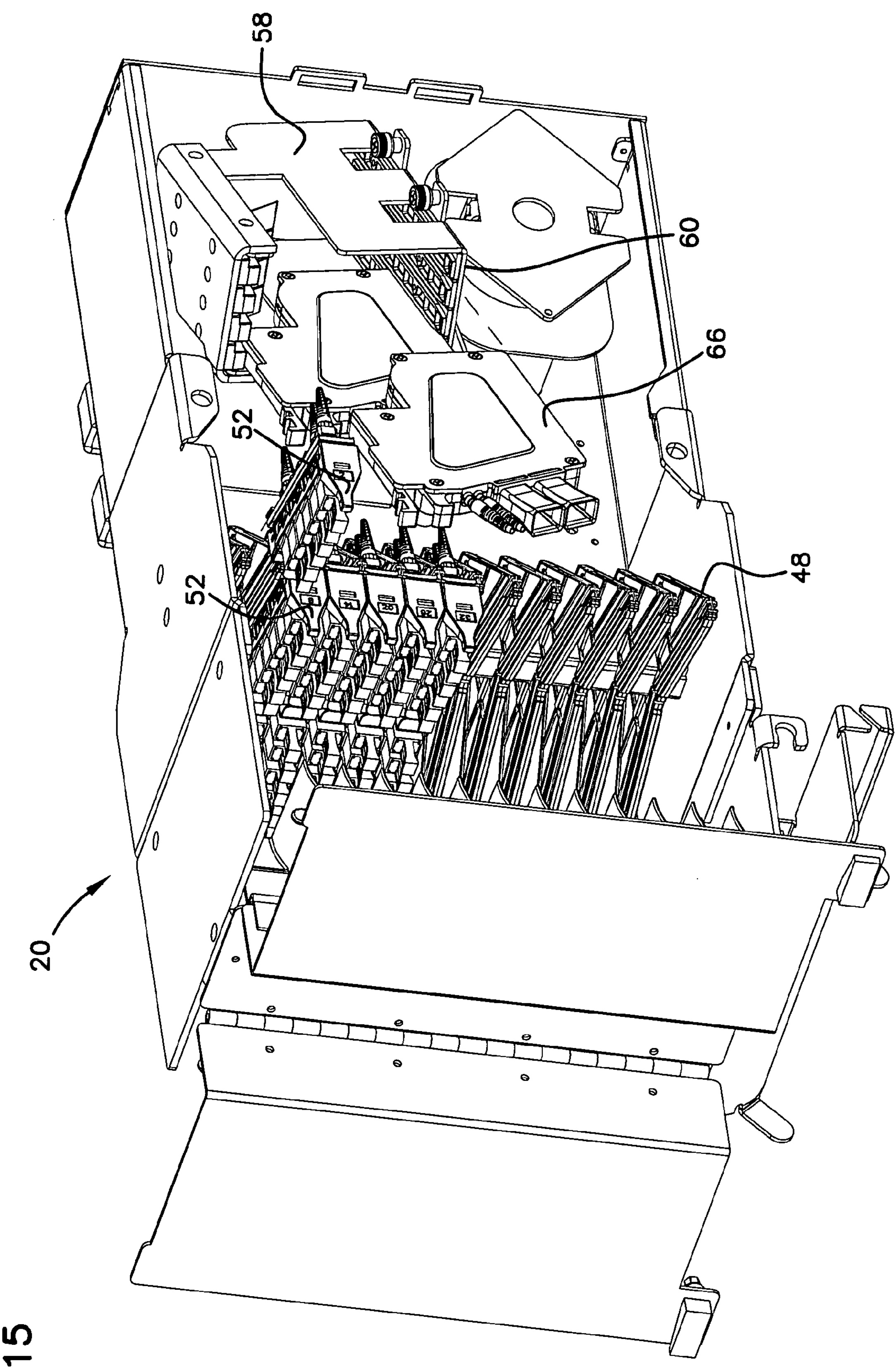
FIG. 15 is a further perspective view of the view of FIG. 14.
Figure 16:
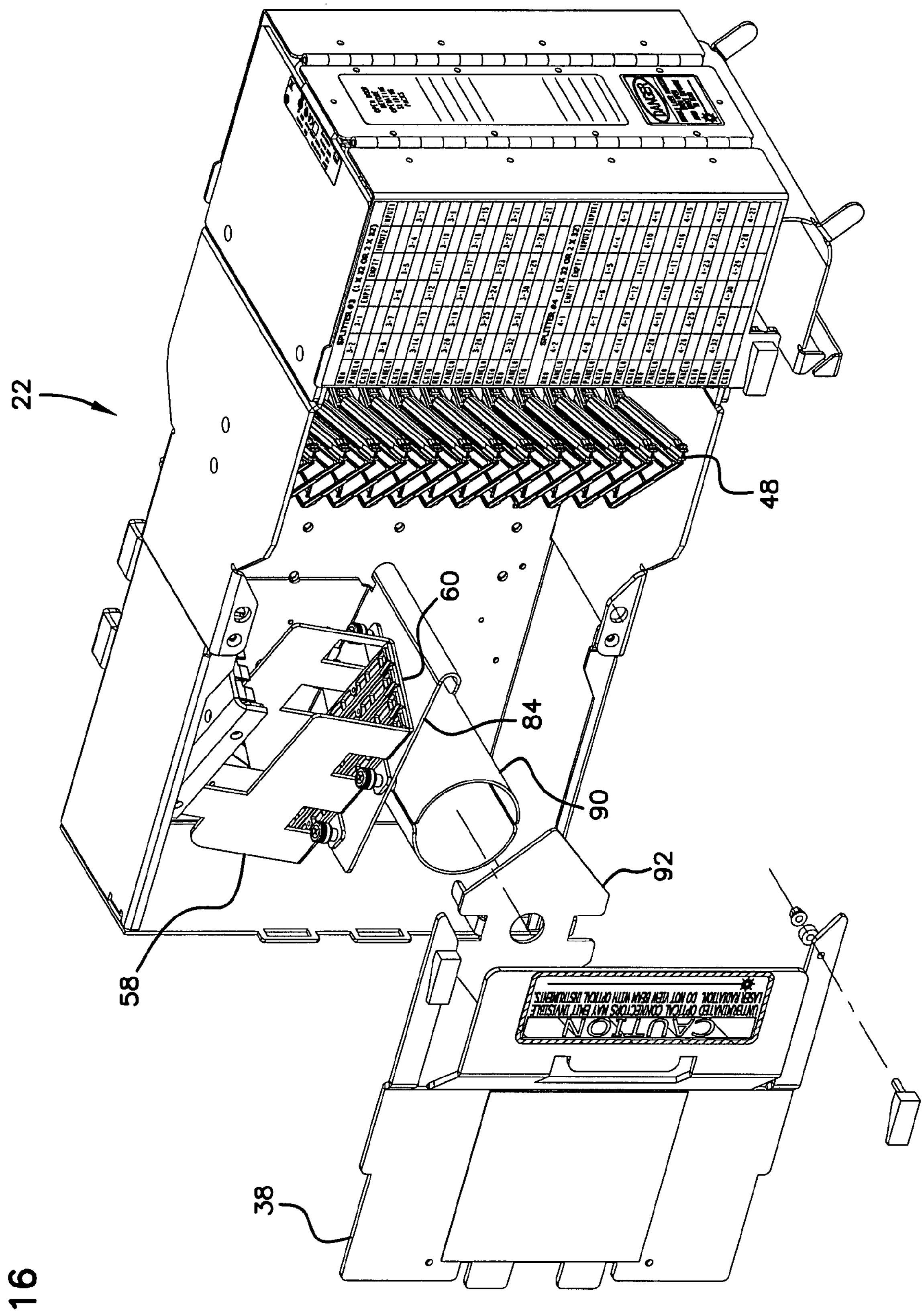
FIG. 16 is a perspective view of the right fiber termination block of FIG. 3, showing the access cover in exploded view.
Figure 17:
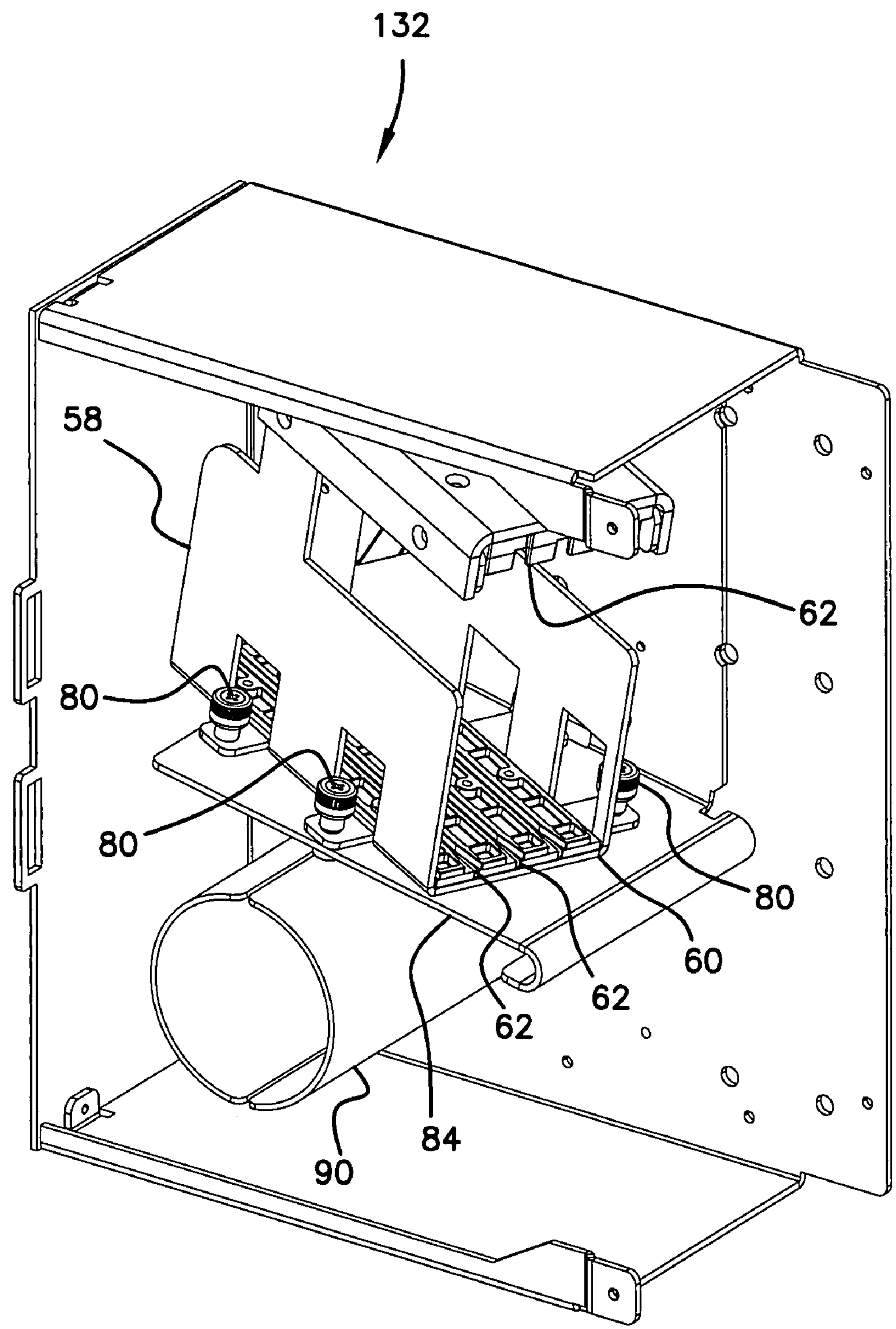
FIG. 17 is a perspective view of the splitter and slack storage unit of the right termination block of FIG. 16.
Figure 18:
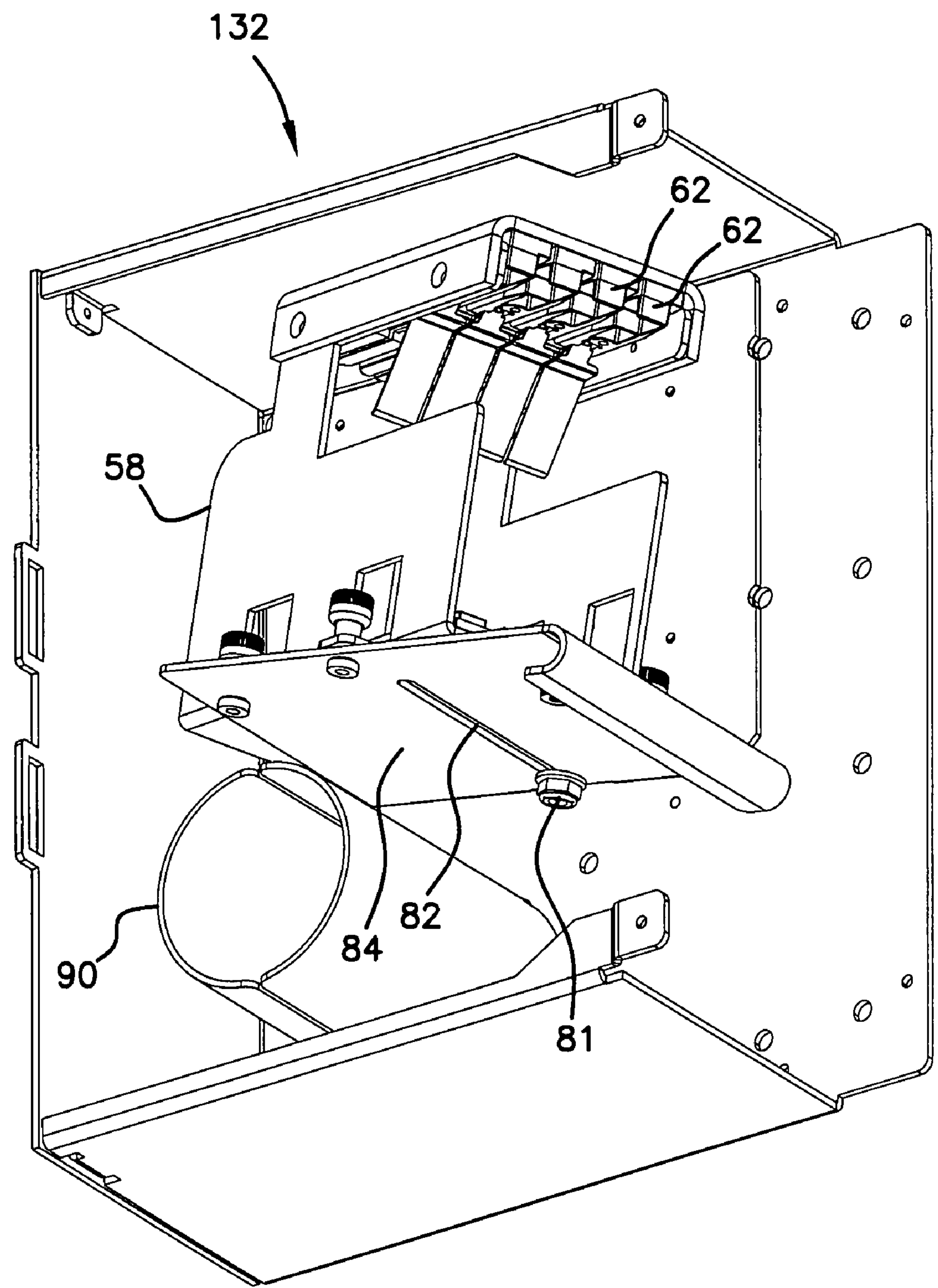
FIG. 18 is a further perspective view of the splitter and slack storage unit of FIG. 17.
Figure 19:
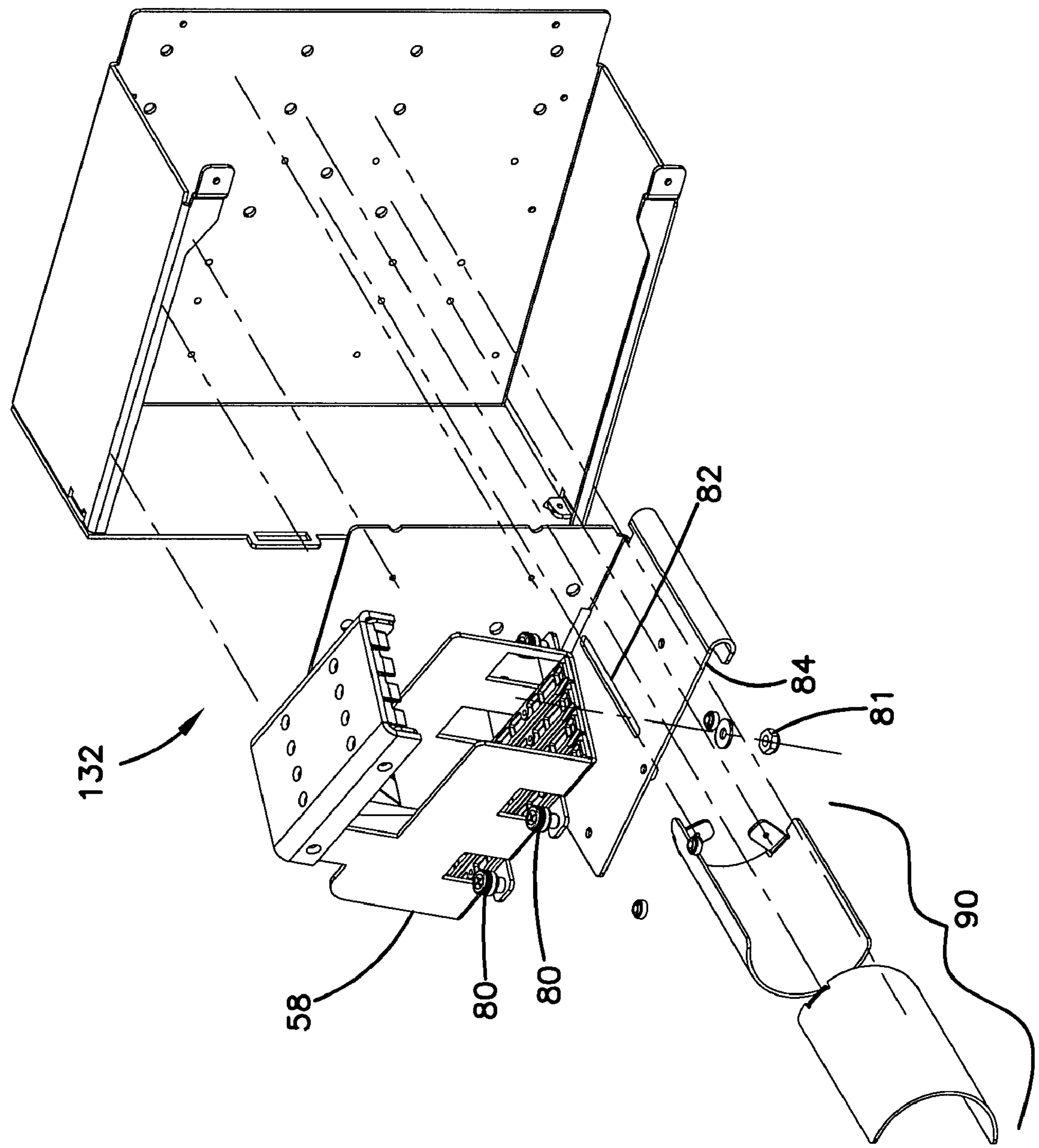
FIG. 19 is an exploded perspective view of the splitter and slack storage unit of FIG. 17.
Figure 20:
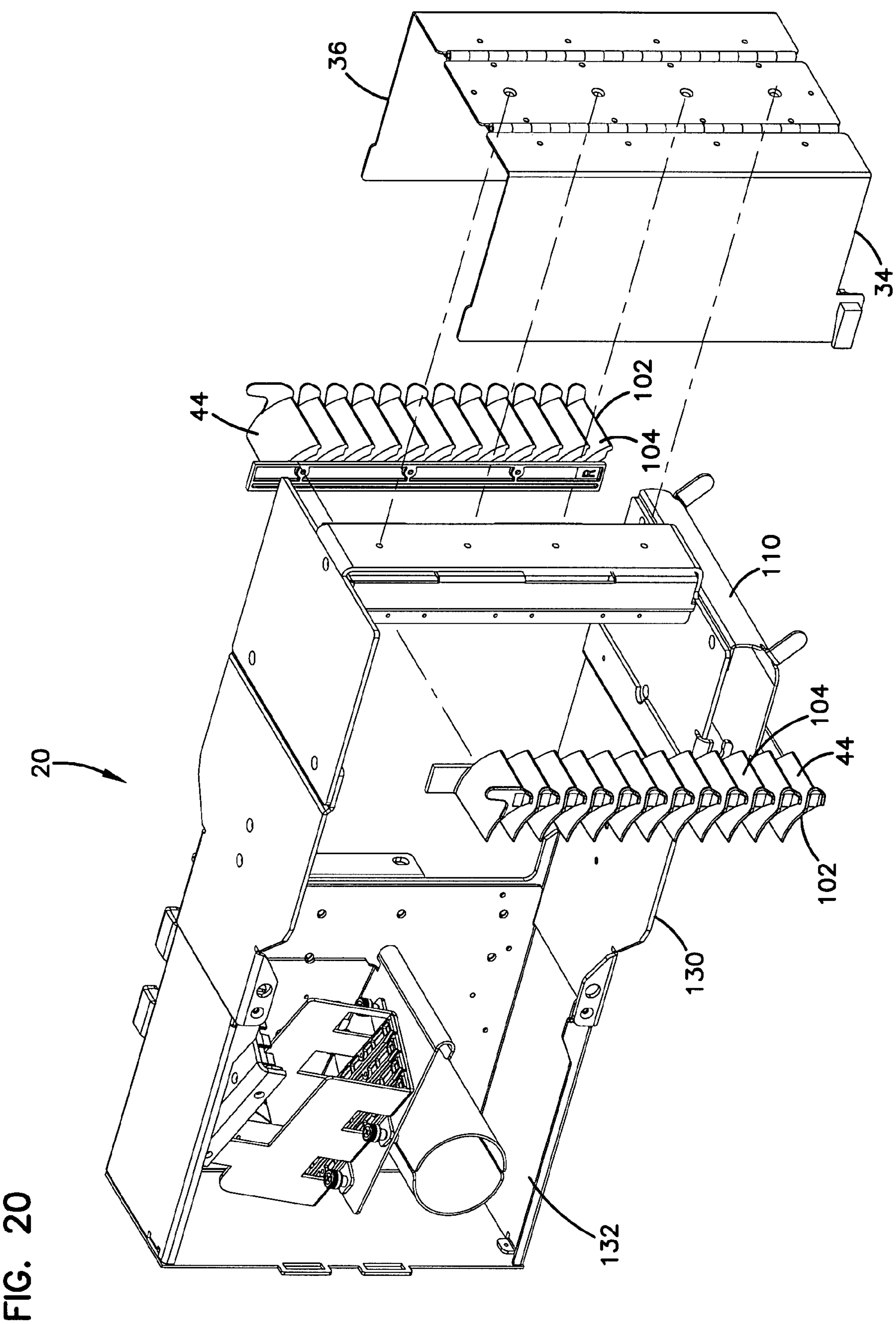
FIG. 20 is a perspective view the right fiber termination block of FIG. 16, with the termination access panels and the front radius limiters in exploded view.
Figure 21:
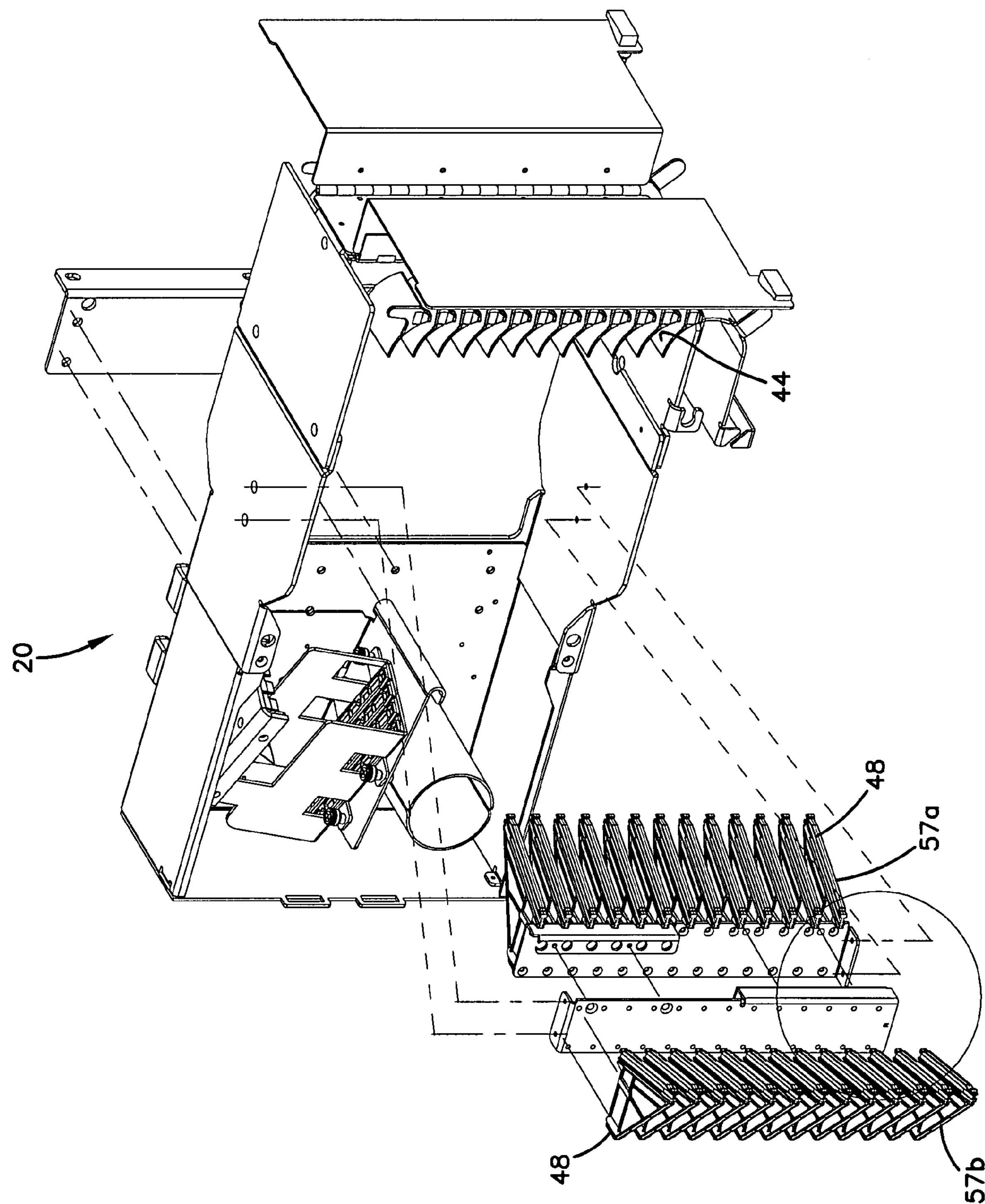
FIG. 21 shows the right termination block of FIG. 20, with the sliding adapter module mounting arrangement in exploded view.
Figure 22:
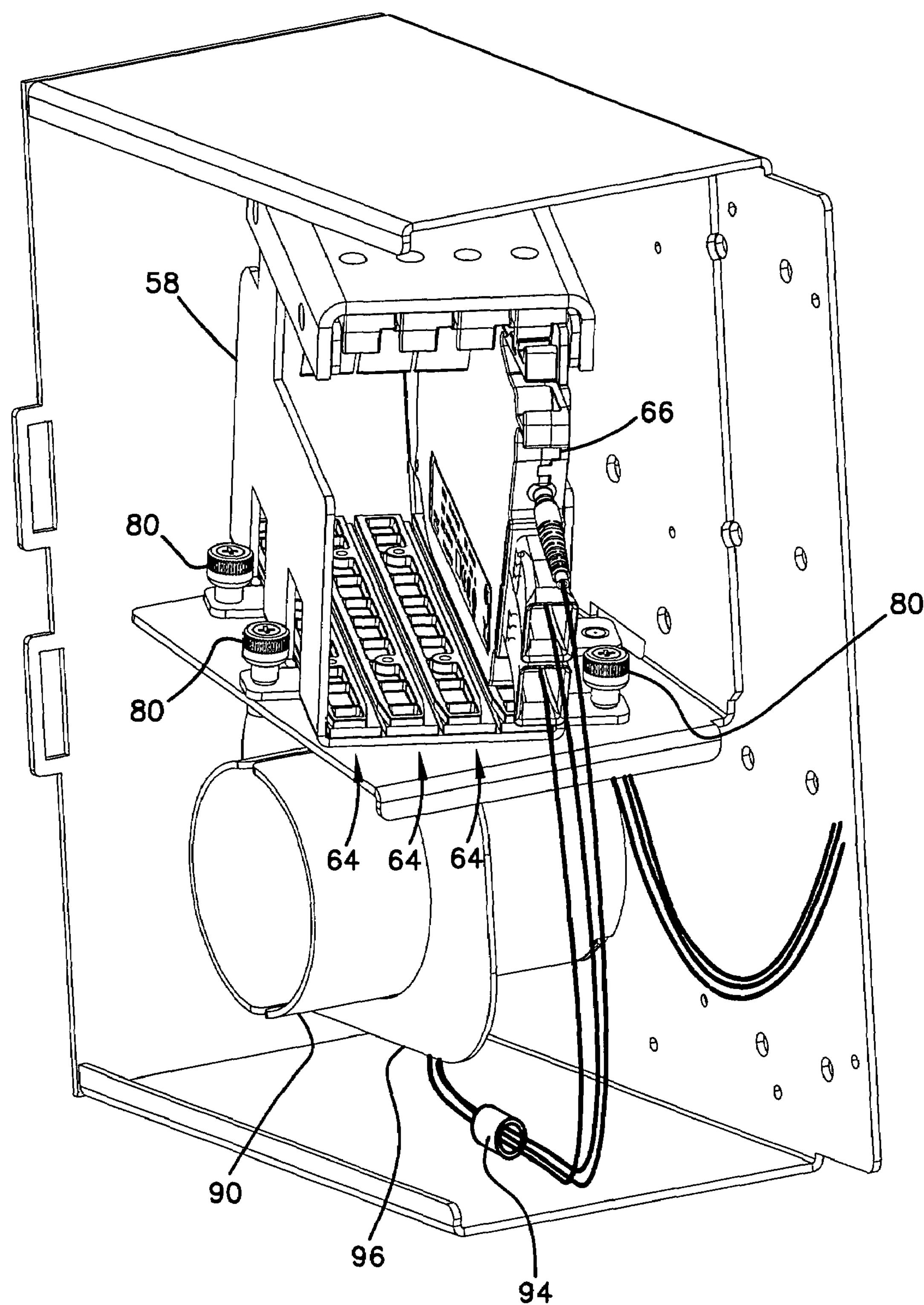
FIG. 22 shows the splitter and slack storage unit of FIG. 17, including an example splitter and cable routing.
Figure 23:
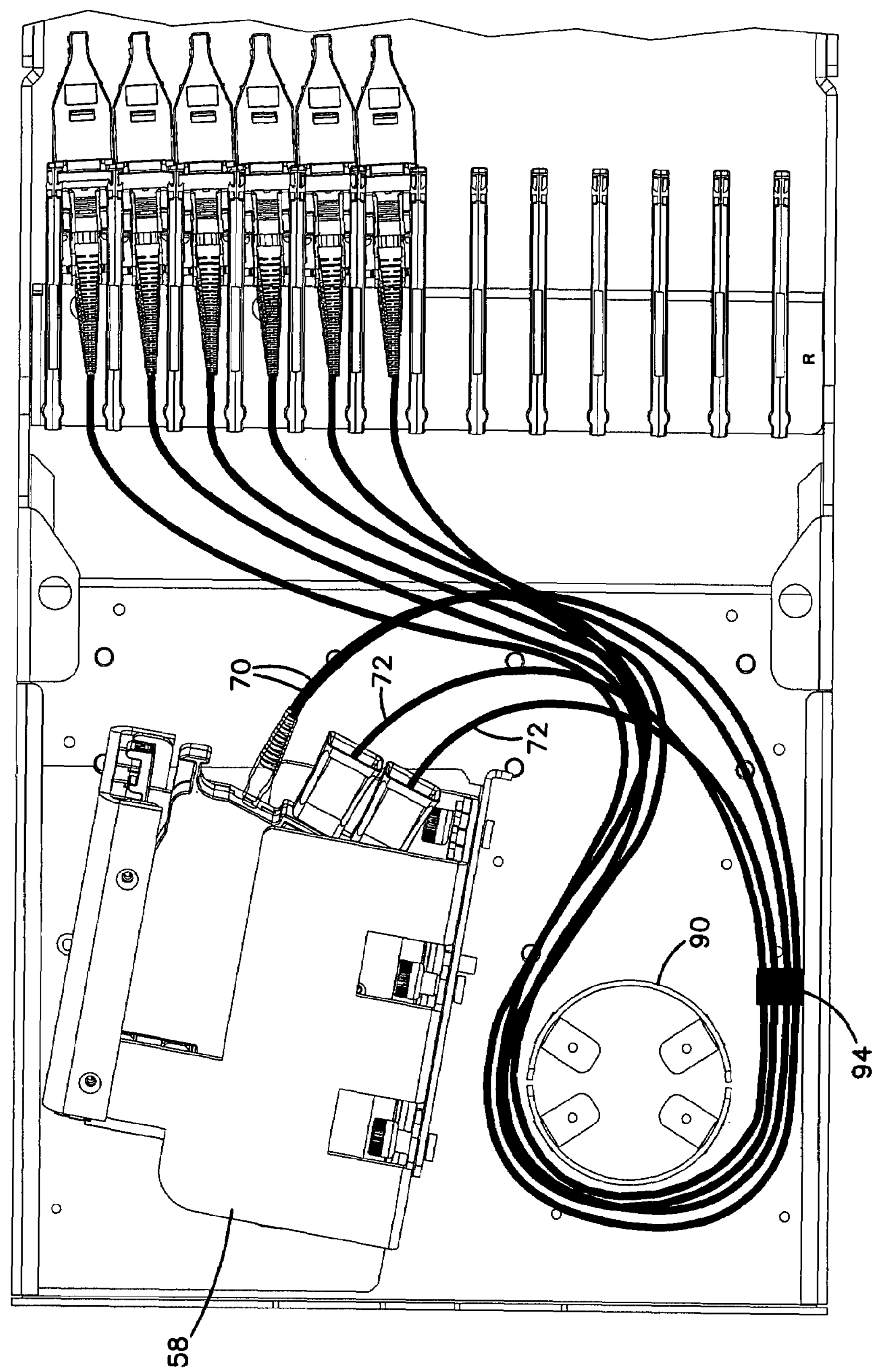
FIG. 23 shows in side view the unit of FIG. 22 and some adapter modules mounted to the block.
Figure 24:
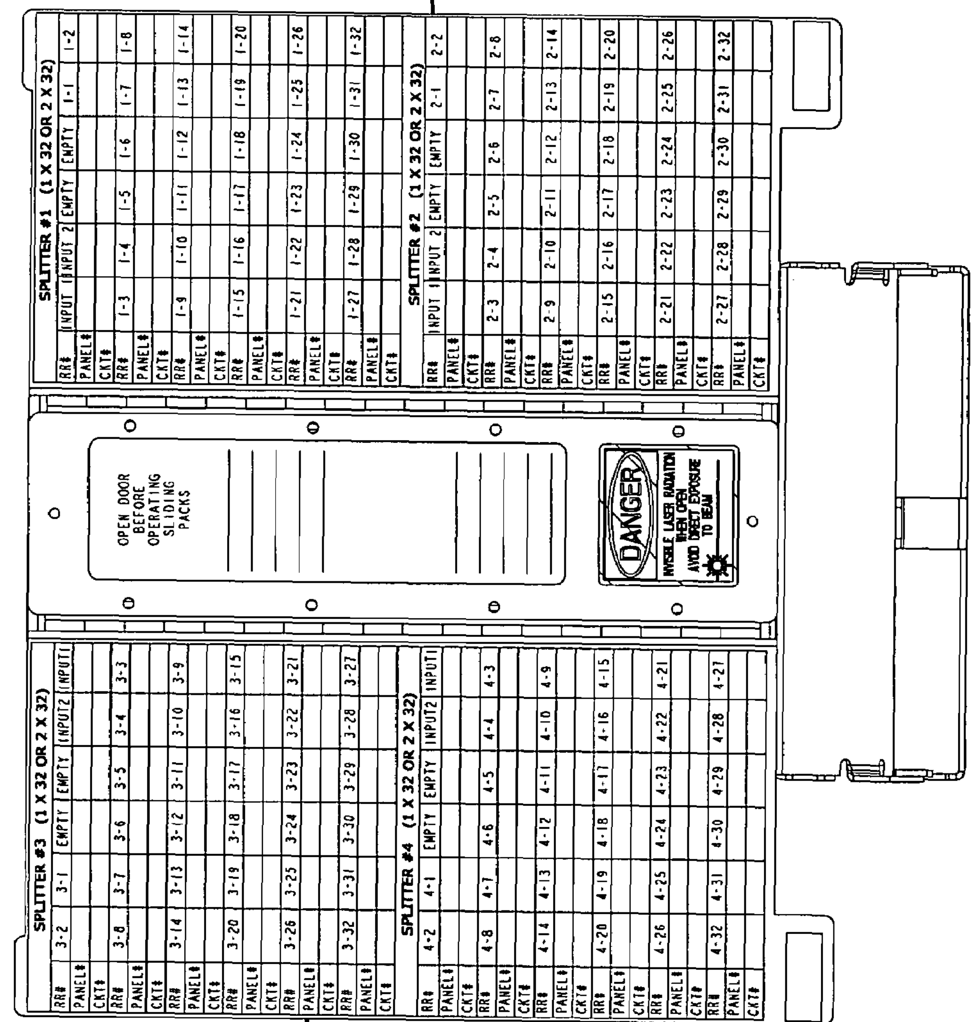
FIG. 24 shows an example labeling arrangement for an exterior of the termination access panels.
Figure 25:
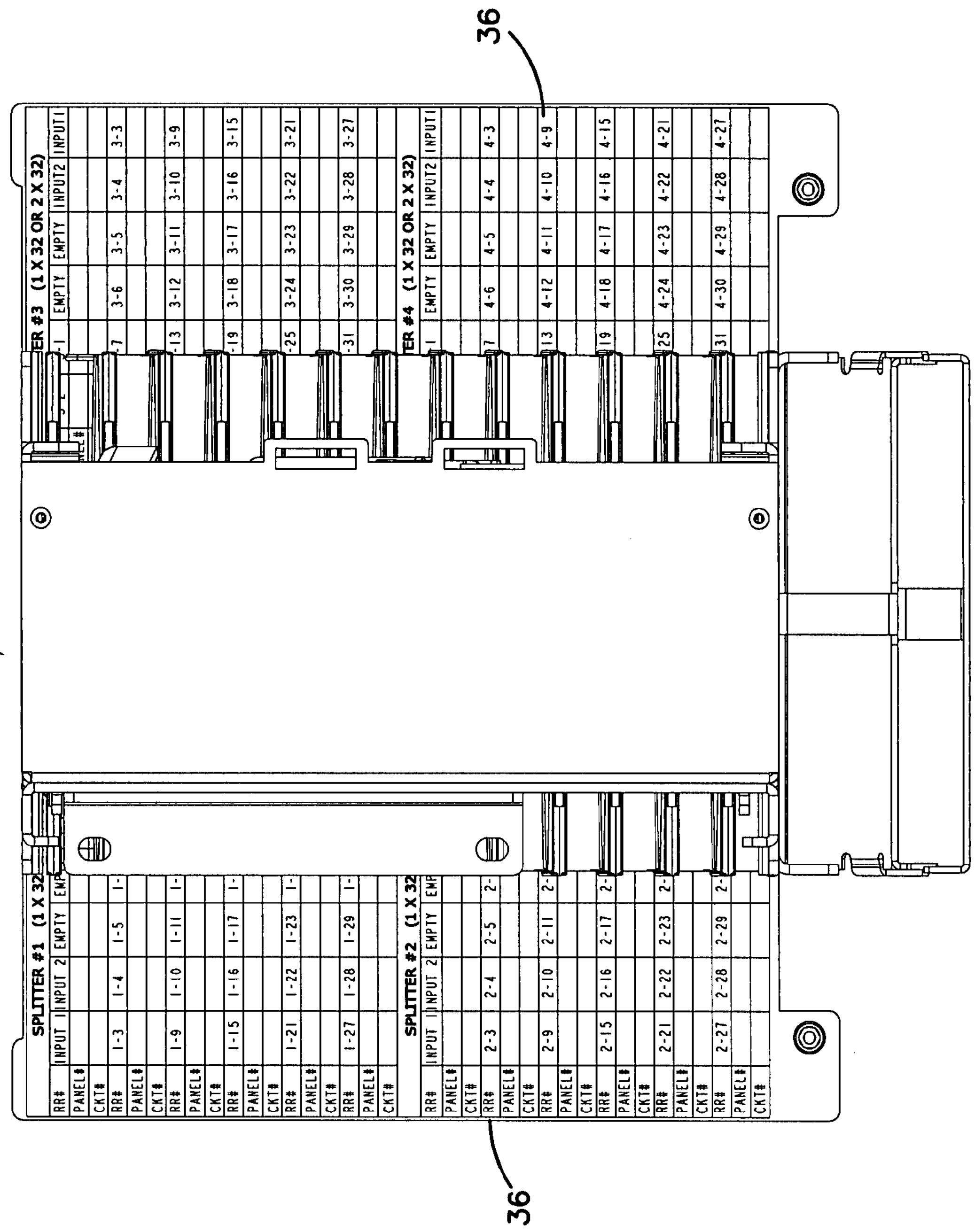
FIG. 25 shows an example labeling arrangement for an interior of the termination access panels.

Splitter chassis 58 is selectively movable to allow improved access to mounting slots 64. As shown in FIGS. 14 and 15, mounting fasteners 80 are loosened and splitter chassis 58 is allowed to rotate outward relative to splitter mounting plate 84. Mounting fastener 81 is allowed to slide in slot 82 to allow open end 60 of chassis 58 to pivot out for greater access to add or remove a selected splitter 66. (See also FIGS. 30-32.) Splitters 66 include a latch 67 for selective latching to splitter chassis 58.

Splitters 66 are preferably modular units that slide into splitter chassis 58. Various splitter designs can be used including those described in U.S. patent application Ser. Nos. 10/980,978, filed Nov. 3, 2004; 11/138,063, filed May 25, 2005; 11/138,889, filed May 25, 2005; 11/354,297, filed Feb. 13, 2006; and 11/064,164, filed Feb. 23, 2005; and U.S. Pat. Nos. 6,885,798 and 7,218,827. These and other modular splitters can be used with connectorized outputs, and inputs to allow for blocks 20, 22 to be populated quickly during initial system setup. Alternatively, a frame with empty blocks 20, 22, as shown in FIGS. 3-8, can be set up initially without splitters 66 or the adaptor modules 52. As the system needs arise, appropriate splitters 66 and adaptor modules 52 can be added. Customers can buy splitters 66, and the output cables 72, and also the input cable or cables 70, remain organized by having the connectors held by the adaptor modules 52. The customer mounts the new splitter 66 in the chassis 58, the new adaptor modules 52 in walls 48, and the cable stack is wound on a cable spool as described below.

The various input and output cables 70, 72 from splitter 66 are provided with appropriate slack so that the adapter modules 52 can be mounted in any of slots 50. Such slack is managed with a cable spool 90 in slack storage area 32. A cable retainer plate 92 helps maintain the slack around spool 90. Individual dividers 96 are positioned between groups of cables to separate the cables for individual splitters. Through the use of dividers 96, the splitters can be handled separately and removed more easily should replacement or repair be desired. Cable ties or loops 94 can be used to organize the input and output cables. As shown in the illustrated example, the inputs and outputs from two splitters 66 populate side 57*a*, and the other two splitters populate side 57*b*.

Front radius limiters 44 define a cable fanning device with a series of spaced cable guides 102 with a curved outer surface 104. Cables connected to the opposite sides of the adapter modules 52 pass through the cable fanning device and are passed around cable guide 110 and into troughing 112 of frame 10 for passing to other blocks or other frames and equipment.

Figure 26:
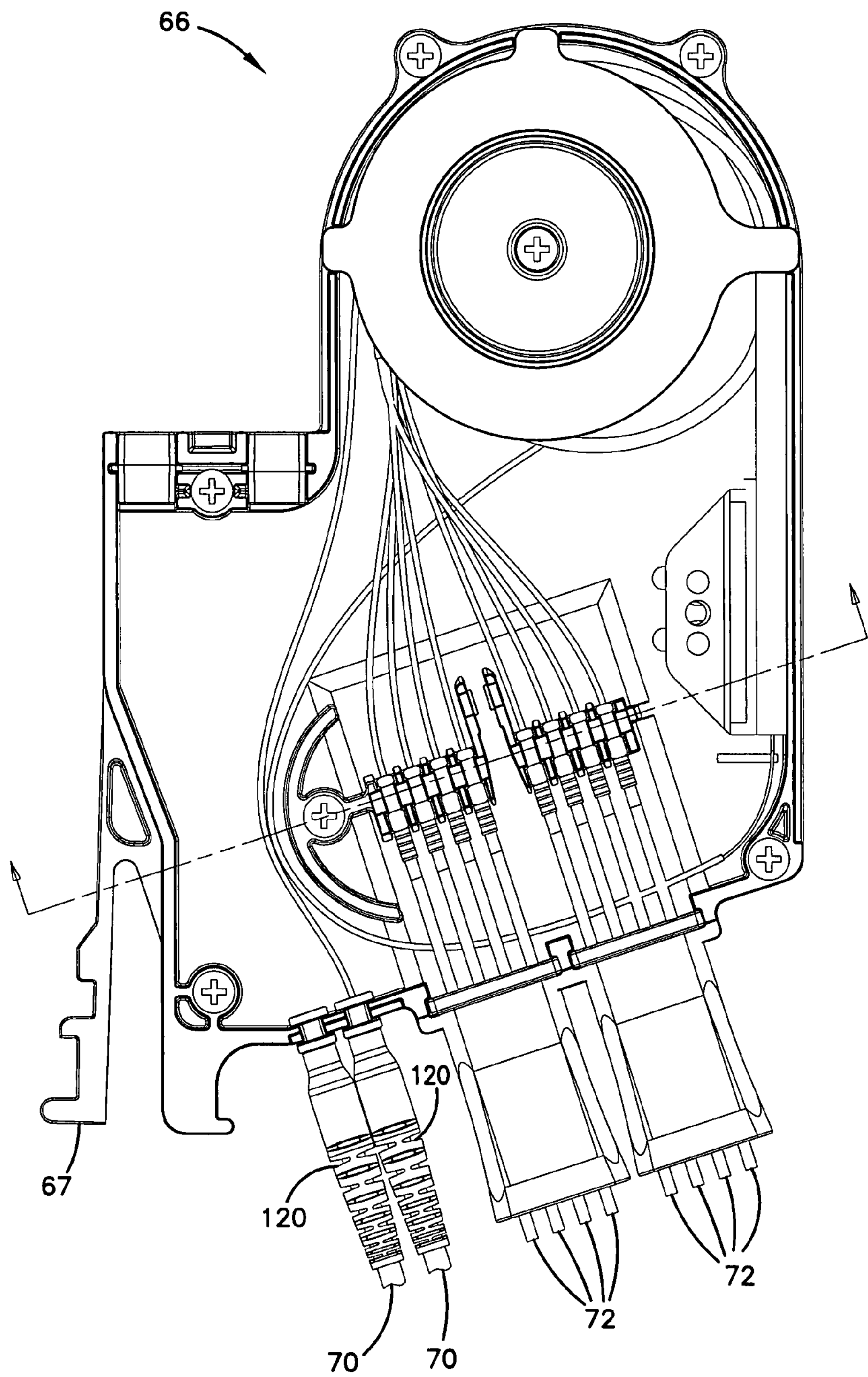
FIG. 26 shows an example of the interior components of the splitter.
Figure 27:
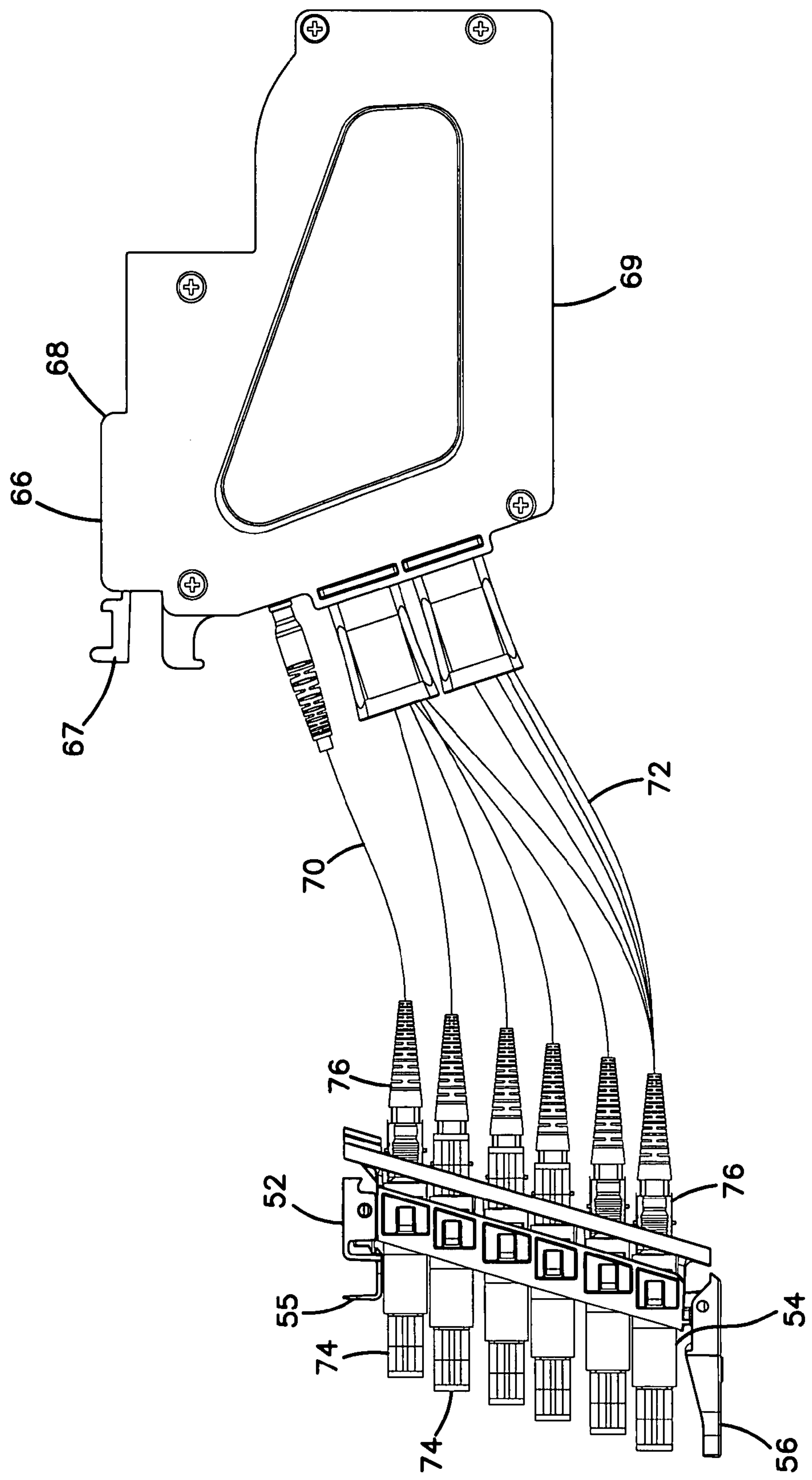
FIG. 27 shows the splitter of FIG. 26, including input and output cables, and the sliding adapter modules which hold the individual connectorized ends of the cables.
Figure 28:
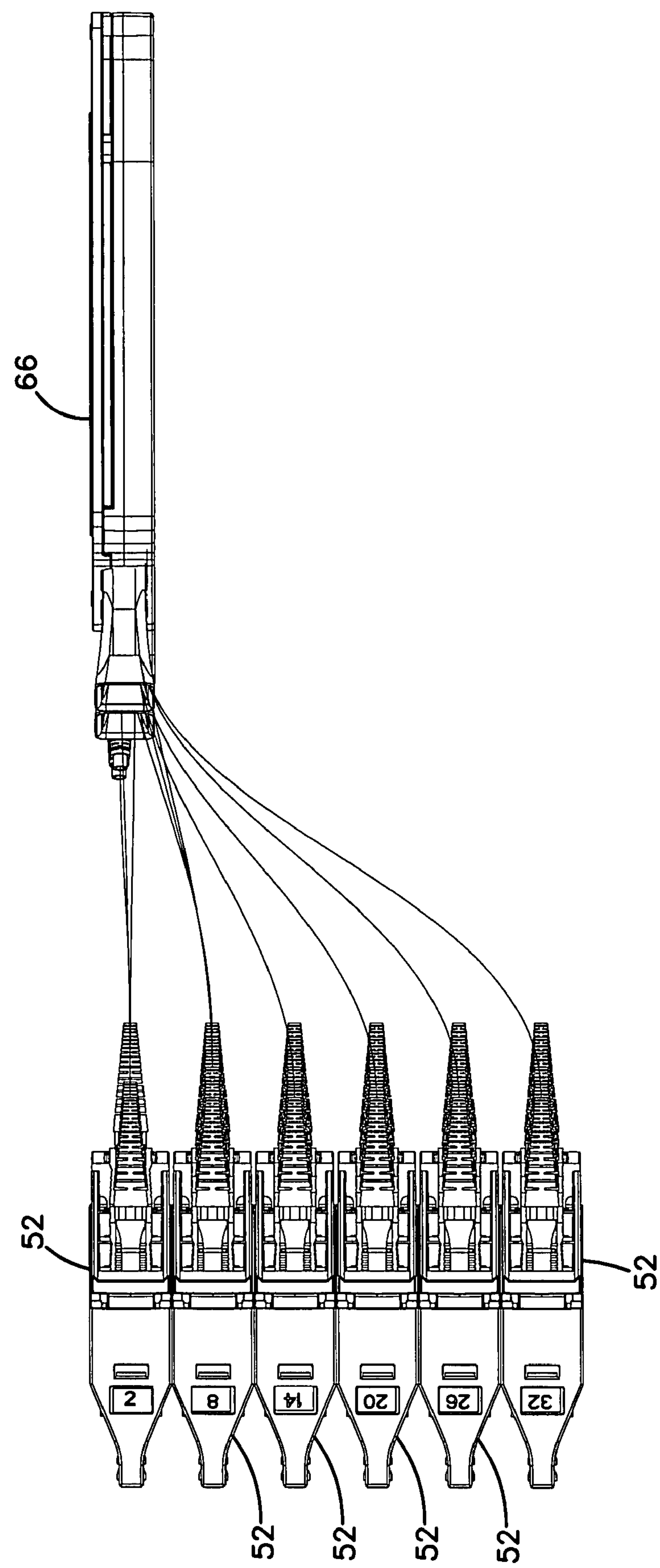
FIG. 28 shows the splitter and sliding adapter modules of FIG. 27 in top view.
Figure 29:
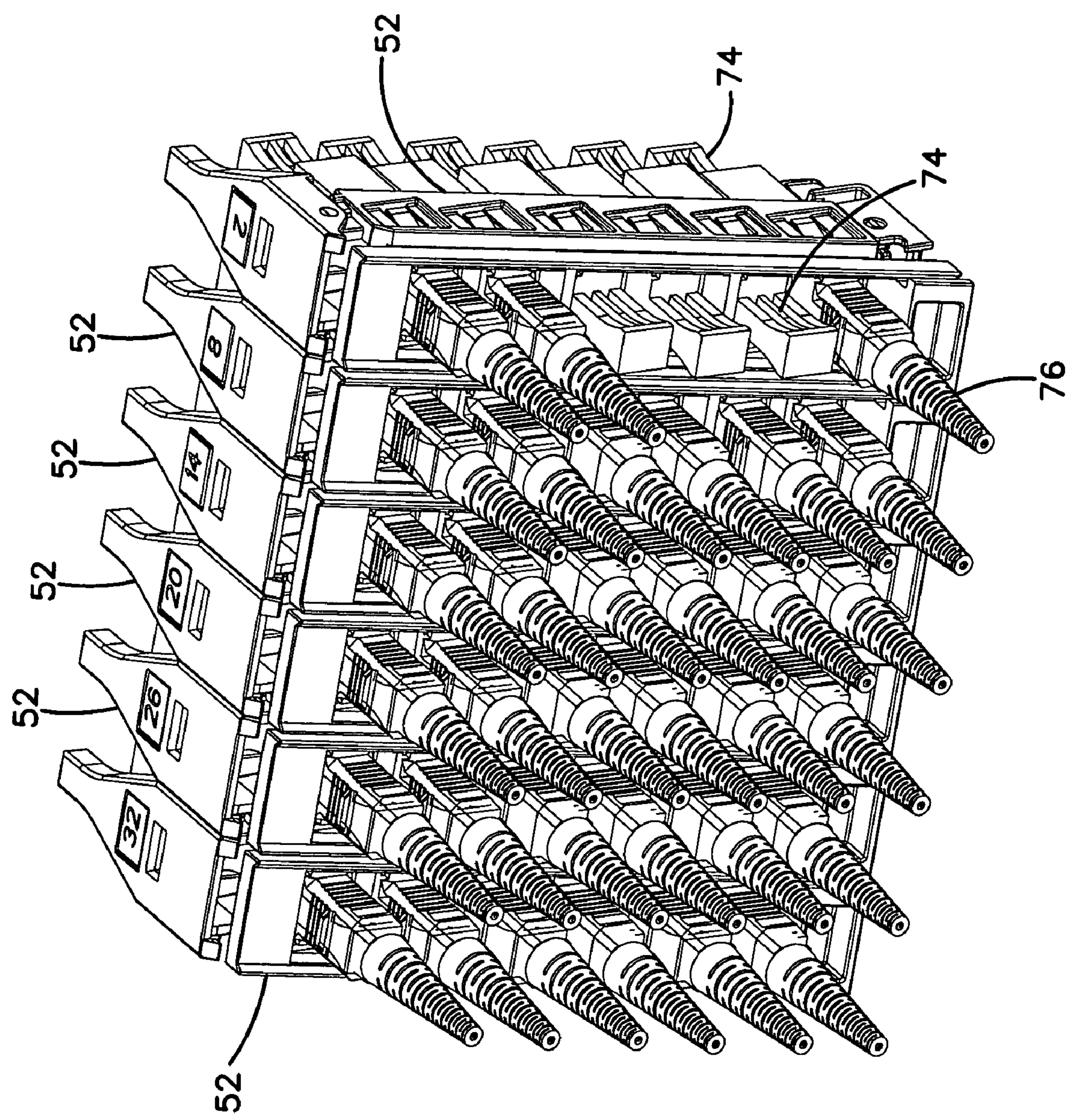
FIG. 29 shows the sliding adapter modules of FIGS. 27 and 28 in perspective view.
Figure 30:
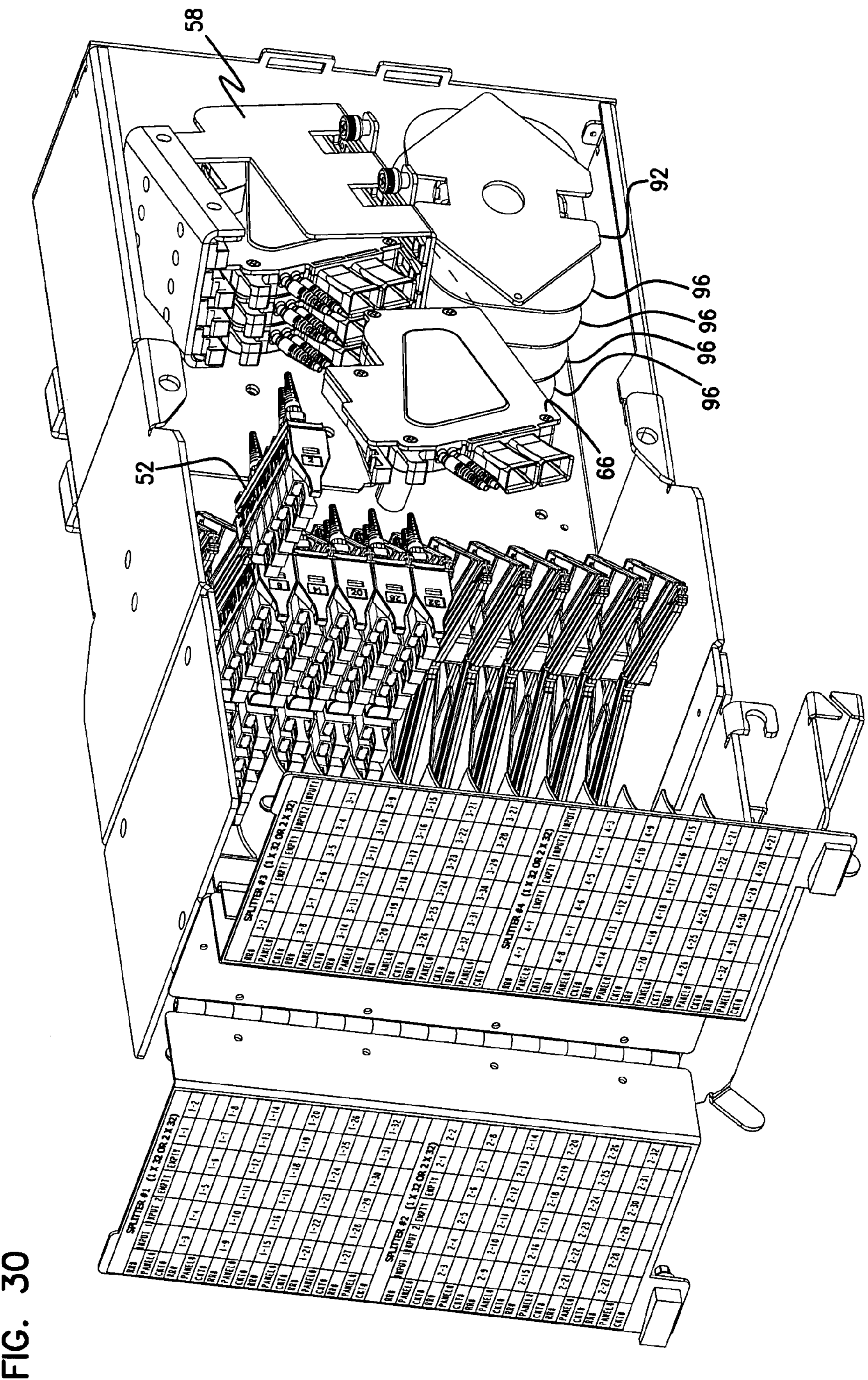
FIGS. 30-32 are perspective views similar to FIGS. 14 and 15 showing four splitters, one in exploded view, and a plurality of cable spool dividers to manage the cables from each splitter.
Figure 31:
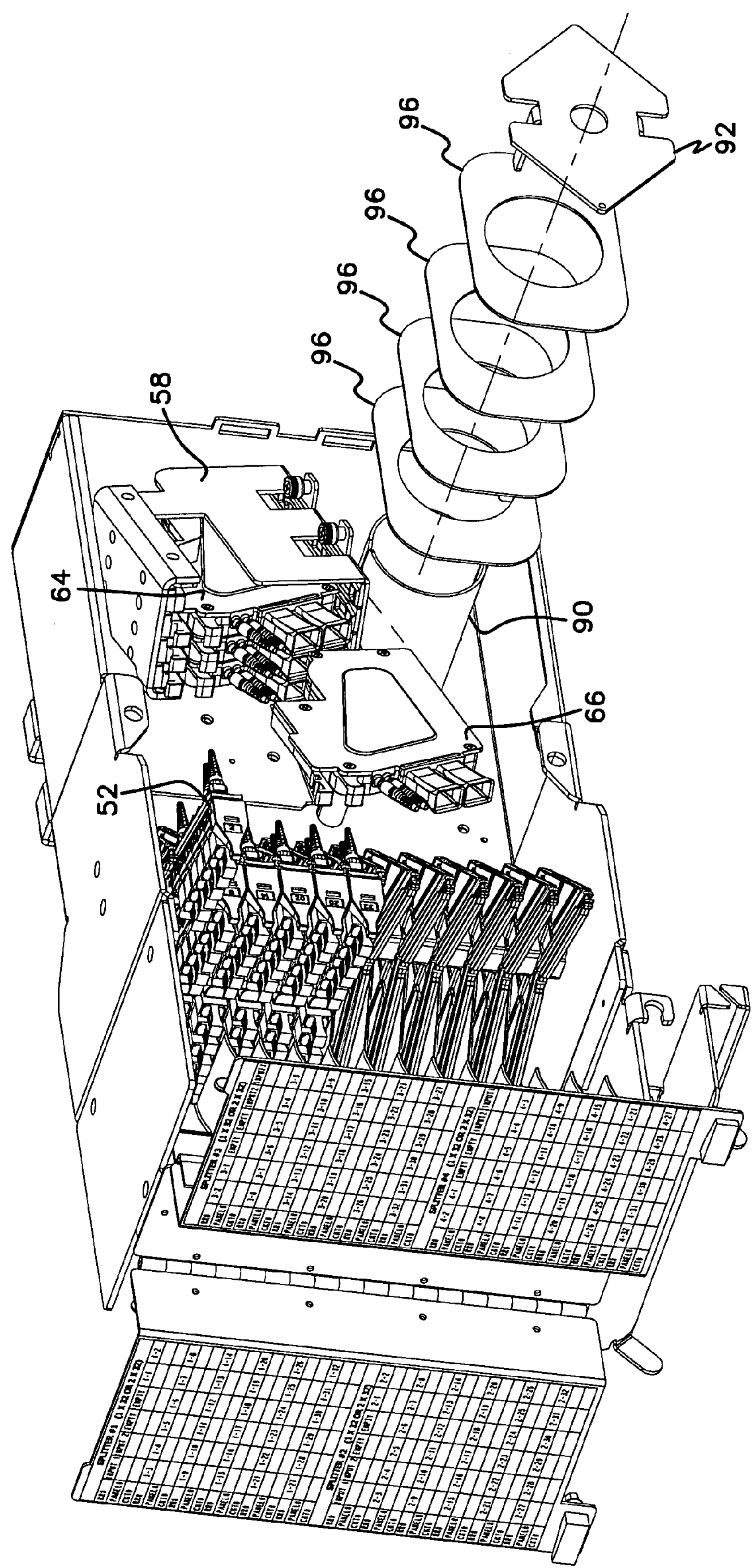
Figure 32:
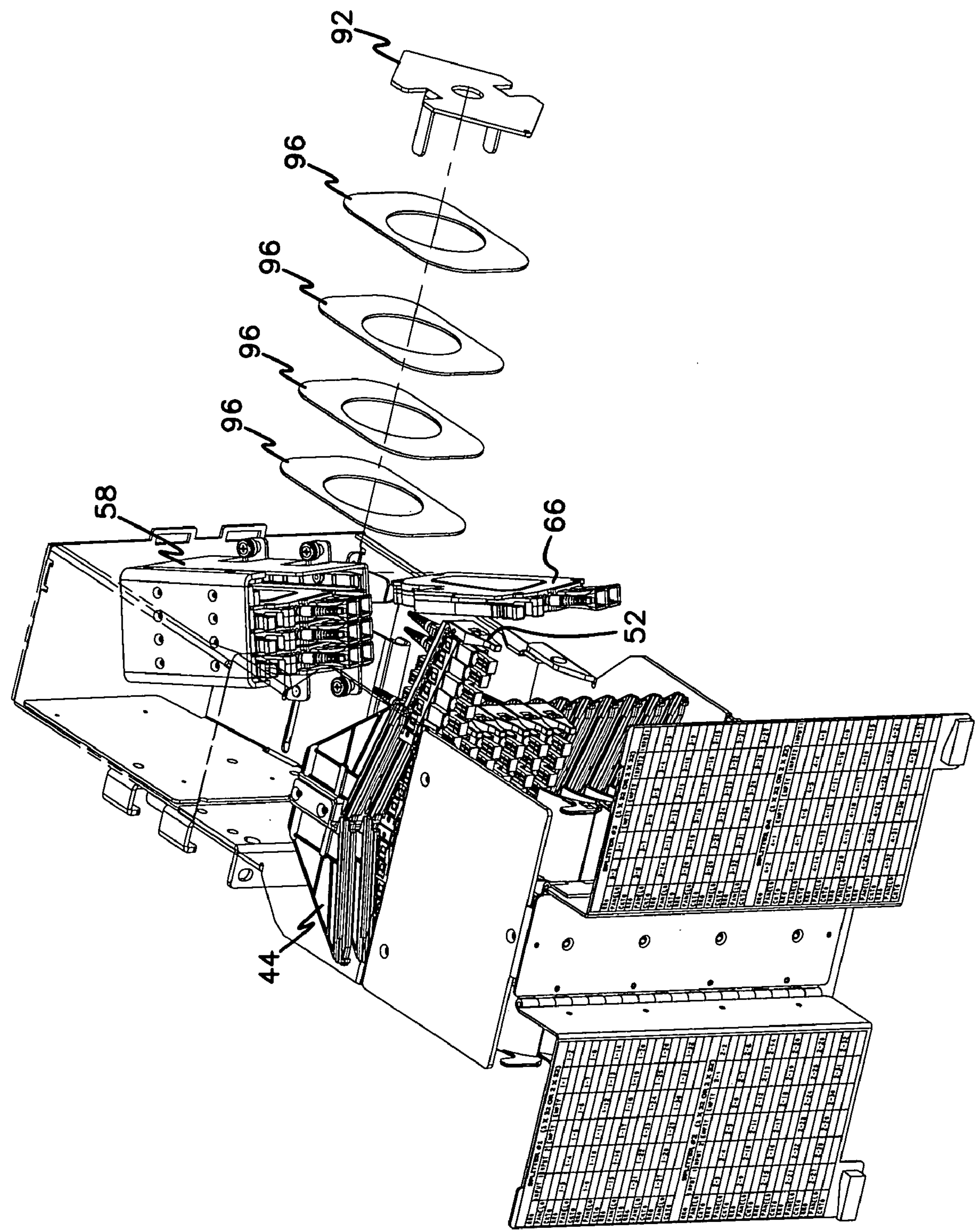

Splitters 66 can be any configuration desired by the customer, including for example 1×32, 1×16, or dual 1×16. If splitter 66 only has one input, then only one input connector 120 is provided. If dual inputs are desired, then two input connectors 120 are used as shown in FIG. 26.

Blocks 20, 22 have a frame 130 which holds splitter and slack storage unit 132, front radius limiters 44, and divider walls 48. Other constructions for blocks 20, 22 are possible.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A signal transmission cable management system comprising:

a fixture defining an interior and an access opening communicating with the interior;

a plurality of modules mounted at module mounting locations within the fixture with each of the modules movably mounted in the fixture for movement along a line of travel, each one of the modules including a plurality of adapters for holding a fiber optic connector, each adapter having opposite ends for coupling to a fiber optic cable connector, each one of the adapters movable with the one of the modules along the line of travel, the plurality of adapters linearly disposed along the line of travel for each of the modules, each adapter defining a longitudinal connector axis, the connector axes positioned parallel to one another;

a splitter chassis mounted within the fixture, the splitter chassis moveably mounted wherein an open end is moveable toward and away from the access opening of the fixture, wherein the open end of the splitter chassis is also moveable with respect to the module mounting locations within the fixture;

a plurality of splitters mounted to the splitter chassis through the open end, each splitter including a latch, each splitter individually latchable to the splitter chassis;

an input cable extending from one of the modules to each of the splitters;

a plurality of output cables extending from the modules to each of the splitters; and a spool mounted on the fixture, the spool having removable dividers and a removable end cap.

2. A system according to claim 1 wherein at least one module has one input cable connected to the one module, and at least two output cables connected to the same one module.

3. A system according to claim 1 wherein a first set of the plurality of modules is moveable in a first direction relative to the fixture, and a second set of the plurality of modules is moveable in a second direction relative to the fixture, the second direction different from the first direction.

4. A system according to claim 1 wherein the modules each have a longitudinal axis, the modules mounted on the fixture in side-by-side relation with the longitudinal axes generally parallel to the line of travel, the plurality of adapters linearly disposed along the longitudinal axis.

5. A system according to claim 1 wherein the fixture defines a plurality of channels, each of the modules being disposed within a respective channel, and further comprising cooperating guides on each of the modules and within the channels accommodating movement of each of the modules along the line of travel.

6. A system according to claim 5 further including a plurality of spaced-apart walls, opposing pairs of the walls defining the plurality of channels, each of the modules being disposed within a respective channel, and wherein the cooperating guides are on each of the walls for attaching the modules to the walls.

7. A system according to claim 3 wherein the modules each have a longitudinal axis, the modules mounted on the fixture in side-by-side relation with the longitudinal axes generally parallel to the line of travel, the plurality of adapters linearly disposed along the longitudinal axis.

8. A system according to claim 7 wherein the fixture defines a plurality of channels, each of the modules being disposed within a respective channel, and further comprising cooperating guides on each of the modules and within the channels accommodating movement of each of the modules along the line of travel.

9. A system according to claim 8 further including a plurality of spaced-apart walls, opposing pairs of the walls defining the plurality of channels, each of the modules being disposed within a respective channel, and wherein the cooperating guides are on each of the walls for attaching the modules to the walls.

10. A fiber optic connector assembly comprising:

a fixture having a first end and a second end;

a plurality of signal transmission modules mounted on the fixture between the first and second ends, with each of the modules movably mounted on the fixture for movement along a line of travel, each one of the modules including a plurality of adapters for holding a fiber optic connector, each one of the adapters movable with one of the modules along the line of travel, each adapter defining a longitudinal axis, the longitudinal axes extending parallel to one another between the first end and the second end of the fixture, wherein a first and a second group of signal transmission modules are movably mounted adjacent to one another on the fixture and are configured so that the line of travel of the first group of signal transmission modules is positioned in a mirror image to the line of travel of the other group of signal transmission modules;

a cable fanning device positioned at the first end, the cable fanning device including a series of spaced cable guides, each cable guide having a linear body extending transversely to the longitudinal axes, the linear body having a curved outer surface, the cable guides positioned such that each of the cables connected to a first side of the modules extends from the adapters in the modules to the curved body of one of the cable guides and passes into a cable channel on the first end of the fixture;

a splitter chassis mounted on the fixture and positioned at the second end, the signal transmission modules positioned between the splitter chassis and the cable fanning device, the splitter chassis moveably mounted wherein an open end is moveable toward and away from the fixture;

a plurality of splitters mounted to the splitter chassis through the open end, at least one input cable extending from one of the signal transmission modules to each splitter, and a plurality of output cables extending from each splitter to one or more of the signal transmission modules; and a spool mounted on the fixture, wherein the input and output cables for each splitter are positioned around the spool.

11. An optical fiber distribution frame comprising:

a support structure defining a vertical support;

a plurality of fiber optic connector assemblies mounted on the vertical support in a single row, each fiber optic assembly including:

a fixture having a first end and a second end;

a plurality of signal transmission modules mounted on the fixture with each of the modules movably mounted on the fixture for movement along a line of travel, each one of the modules including a plurality of adapters for holding a fiber optic connector, each one of the adapters movable with one of the modules along the line of travel, each adapter defining a longitudinal axis, the longitudinal axes extending parallel to one another between the first end and the second end of the fixture;

a cable fanning device positioned adjacent to the first end, the cable fanning device including a series of spaced arcuate cable guides, each arcuate cable guide having a linear body extending transversely to the longitudinal axes, the linear body having a curved outer surface, the arcuate cable guides positioned such that each of the cables connected to a first side of the modules extends from the adapters in the modules to the curved body of one of the arcuate cable guides and passes into a cable channel on the first end of the fixture;

a splitter chassis mounted on the fixture and positioned at the second end, the signal transmission modules positioned between the splitter chassis and the cable fanning device, the splitter chassis moveably mounted wherein an open end is moveable toward and away from the fixture;

a plurality of splitters mounted to the splitter chassis through the open end, at least one input cable extending from one of the signal transmission modules to each splitter, and a plurality of output cables extending from each splitter to one or more of the signal transmission modules; and a spool mounted on the fixture, wherein the input and output cables for each splitter are positioned around the spool.

12. The optical fiber distribution frame of claim 11 wherein a first and a second group of signal transmission modules are movably mounted adjacent to one another on the fixture and are configured so that the line of travel of the first group of signal transmission modules is positioned in a mirror image to the line of travel of the other group of signal transmission modules, and further that the first group and the second group of signal transmission modules are configured to move in opposite angled directions to the cable fanning device.

13. A signal transmission cable management system comprising:

a fixture defining an interior and an access opening communicating with the interior, wherein the fixture defines a plurality of channels, each of the channels sized to receive a module being disposed within a respective channel, and further comprising cooperating guides on each of the modules and within the channels accommodating movement of each of the modules along a line of travel, the fixture including a plurality of spaced-apart walls, opposing pairs of the walls defining the plurality of channels, each of the modules being positionable within a respective channel, and wherein the cooperating guides are on each of the walls for attaching the modules to the walls, wherein a plurality of modules can be mounted on the fixture with each of the modules movably mounted on the fixture for movement along the line of travel, each one of the modules including a plurality of adapters for holding a fiber optic connector, each adapter having opposite ends for coupling to a fiber optic cable connector, each one of the adapters movable with the one of the modules along the line of travel, the plurality of adapters linearly disposed along the line of travel for each of the modules, each adapter defining a longitudinal connector axis, the connector axes positioned parallel to one another;

a splitter chassis mounted within the fixture, the splitter chassis moveably mounted wherein an open end is moveable toward and away from the access opening of the fixture, wherein the open end of the splitter chassis is also moveable with respect to the plurality of channels of the fixture, wherein a plurality of splitters can be mounted to the splitter chassis, each splitter including a latch, each splitter individually latchable to the splitter chassis, wherein each splitter includes at least one input cable extending from one of the modules to each of the splitters, and a plurality of output cables extending from one or more of the modules to each of the splitters; and a spool mounted on the fixture, the spool having removable dividers and a removable end cap.

14. A fiber optic connector assembly comprising:

a fixture having a first end and a second end;

a plurality of signal transmission module mounts mounted on the fixture between the first and second ends for use in mounting modules, with each of the modules being movably mountable on the fixture for movement along a line of travel, each one of the modules including a plurality of adapters for holding a fiber optic connector, each one of the adapters movable with one of the modules along the line of travel, each adapter defining a longitudinal axis, the longitudinal axes extending parallel to one another between the front end and the back end of the fixture, wherein a first and a second group of signal transmission modules are movably mounted adjacent to one another on the fixture and are configured so that the line of travel of the first group of signal transmission modules is positioned in a mirror image to the line of travel of the other group of signal transmission modules, and further that the first group and the second group of signal transmission modules are configured to move in opposite directions to a cable fanning device;

the cable fanning device positioned at the first end, the cable fanning device including a series of spaced cable guides, each cable guide having a linear body extending transversely to the longitudinal axes, the linear body having a curved outer surface, the cable guides positioned such that each of the cables connected to a first side of the modules extends from the adapters in the modules to the curved body of one of the cable guides and passes into a cable channel on the first end of the fixture;

a splitter chassis mounted on the fixture and positioned at the second end, the signal transmission modules positioned between the splitter chassis and the cable fanning device, the splitter chassis moveably mounted wherein an open end is moveable toward and away from the fixture for mounting a plurality of splitters to the fixture, wherein at least one input cable extends from one of the signal transmission modules to each splitter, and a plurality of output cables extend from each splitter to one or more of the signal transmission modules; and a spool mounted on the fixture, wherein the input and output cables for each splitter are positioned around the spool.

15. An optical fiber distribution frame comprising:

a support structure defining a vertical support;

a plurality of fiber optic connector assemblies mounted on the vertical support in a single row, each fiber optic assembly including:

a fixture having a first end and a second end;

a plurality of signal transmission module mounts mounted on the fixture for use in mounting modules with each of the modules movably mountable on the fixture for movement along a line of travel, each one of the modules including a plurality of adapters for holding a fiber optic connector, each one of the adapters movable with one of the modules along the line of travel, each adapter defining a longitudinal axis, the longitudinal axes extending parallel to one another between the first end and the second end of the fixture;

a cable fanning device positioned adjacent to the first end, the cable fanning device including a series of spaced arcuate cable guides, each arcuate cable guide having a linear body extending transversely to the longitudinal axes, the linear body having a curved outer surface, the arcuate cable guides positioned such that each of the cables connected to a first side of the modules extends from the adapters in the modules to the curved body of one of the arcuate cable guides and passes into a cable channel on the first end of the fixture;

a splitter chassis mounted on the fixture and positioned at the second end, the signal transmission modules positioned between the splitter chassis and the cable fanning device, the splitter chassis moveably mounted wherein an open end is moveable toward and away from the fixture for mounting a plurality of splitters to the fixture, wherein at least one input cable extends from one of the signal transmission modules to each splitter, and a plurality of output cables extend from each splitter to one or more of the signal transmission modules; and a spool mounted on the fixture, wherein the input and output cables for each splitter are positioned around the spool.

16. The optical fiber distribution frame of claim 15, wherein a first and a second group of signal transmission module mounts are mounted adjacent to one another on the fixture and are configured so that the line of travel of a first group of signal transmission modules is positionable in a mirror image to the line of travel of a second group of signal transmission modules, and further that the first group and the second group of signal transmission modules are configured to move in opposite angled directions to the cable fanning device.

17. A signal transmission cable management system comprising:

a fixture;

a plurality of modules mounted on the fixture with each of the modules movably mounted on the fixture for movement along a line of travel, each one of the modules including a plurality of adapters for holding a fiber optic connector, each adapter having opposite ends for coupling to a fiber optic cable connector, each one of the adapters movable with the one of the modules along the line of travel, the plurality of adapters linearly disposed along the line of travel for each of the modules, each adapter defining a longitudinal connector axis, the connector axes positioned parallel to one another;

a splitter chassis mounted on the fixture, the splitter chassis moveably mounted wherein an open end is moveable toward and away from the fixture;

a plurality of splitters mounted to the splitter chassis through the open end, each splitter including a latch, each splitter individually latchable to the splitter chassis;

an input cable extending from one of the modules to each of the splitters;

a plurality of output cables extending from the modules to each of the splitters; and a spool mounted on the fixture, the spool having removable dividers and a removable end cap.

18. A signal transmission cable management system comprising:

a fixture wherein the fixture defines a plurality of channels, each of the channels sized to receive a module being disposed within a respective channel, and further comprising cooperating guides on each of the modules and within the channels accommodating movement of each of the modules along a line of travel, the fixture including a plurality of spaced-apart walls, opposing pairs of the walls defining the plurality of channels, each of the modules being positionable within a respective channel, and wherein the cooperating guides are on each of the walls for attaching the modules to the walls, wherein a plurality of modules can be mounted on the fixture with each of the modules movably mounted on the fixture for movement along the line of travel, each one of the modules including a plurality of adapters for holding a fiber optic connector, each adapter having opposite ends for coupling to a fiber optic cable connector, each one of the adapters movable with the one of the modules along the line of travel, the plurality of adapters linearly disposed along the line of travel for each of the modules, each adapter defining a longitudinal connector axis, the connector axes positioned parallel to one another;

a splitter chassis mounted on the fixture, the splitter chassis moveably mounted wherein an open end is moveable toward and away from the fixture, wherein a plurality of splitters can be mounted to the splitter chassis, each splitter including a latch, each splitter individually latchable to the splitter chassis, wherein each splitter includes at least one input cable extending from one of the modules to each of the splitters, and a plurality of output cables extending from one or more of the modules to each of the splitters; and a spool mounted on the fixture, the spool having removable dividers and a removable end cap.

* * * * *